US009880795B2

(12) United States Patent
Ueda et al.

(10) Patent No.: US 9,880,795 B2
(45) Date of Patent: Jan. 30, 2018

(54) RECORDING SYSTEM, RECORDING APPARATUS, INFORMATION PROCESSING APPARATUS, AND RECORDING CONTROL METHOD THAT SHIFT RANGE OF RECORDING ELEMENTS

(71) Applicant: CANON FINETECH NISCA INC., Misato-shi, Saitama-ken (JP)

(72) Inventors: Kenji Ueda, Tokyo (JP); Yasukazu Ono, Saitama (JP)

(73) Assignee: Canon Finetech Nisca, Inc., Misato-shi (JP)

( * ) Notice: Subject to any disclaimer, the term of this patent is extended or adjusted under 35 U.S.C. 154(b) by 0 days.

(21) Appl. No.: 14/066,849

(22) Filed: Oct. 30, 2013

(65) Prior Publication Data

US 2014/0153041 A1    Jun. 5, 2014

(30) Foreign Application Priority Data

Dec. 4, 2012   (JP) ................................ 2012-265651
Dec. 4, 2012   (JP) ................................ 2012-265653

(51) Int. Cl.
G06F 3/12          (2006.01)

(52) U.S. Cl.
CPC ............ G06F 3/1282 (2013.01); G06F 3/121 (2013.01); G06F 3/1208 (2013.01); G06F 3/1247 (2013.01)

(58) Field of Classification Search
CPC .. B41J 2/21139; B41J 2/2146; B41J 2/16585; B41J 2/2142; B41J 2/2132;
(Continued)

(56) References Cited

U.S. PATENT DOCUMENTS 6,565,180 B2 *   5/2003   Yu ........................... B41J 2/0451
                                                                347/14
6,964,465 B2 *   11/2005  Endo .................... B41J 2/04505
                                                                347/19

(Continued)

FOREIGN PATENT DOCUMENTS

JP          05-162304 A    6/1993
JP          10-764 A       1/1998
(Continued)

OTHER PUBLICATIONS

Office Action in Japanese Patent Application No. 2012-265653, dated Sep. 8, 2014.

*Primary Examiner* — Hai Phan
*Assistant Examiner* — Jonathan R Beckley
(74) *Attorney, Agent, or Firm* — Fitzpatrick, Cella, Harper & Scinto

(57) ABSTRACT

A recording system, includes a recording apparatus configured to perform recording using a recording head having a plurality of recording elements; and an information processing apparatus configured to send a print job to the recording apparatus to shift a range of use of the recording elements in an array direction of the recording elements. The information processing apparatus includes a head shading correction unit configured to execute, based on information indicating that the range of use of the recording elements is one of plural ranges of use, head shading correction corresponding to the one range on image data; and a sending unit configured to send the image data subjected to the head shading correction to the recording apparatus. The recording apparatus includes a recording control unit configured to control the recording head to perform recording at the one range by using the image data subjected to the head shading correction.

13 Claims, 23 Drawing Sheets

(58) Field of Classification Search
CPC .... B41J 2/04513; B41J 11/008; B41J 2/2135;
B41J 2/2139; B41J 2/04545; B41J
2/04501; B41J 2/04586; B41J 15/06;
B41J 2/155; B41J 2/2103; B41J 2/04551;
B41J 29/38; B41J 29/393; B41J 2202/21;
G06K 15/102; G06K 15/105; G06K
15/107; H04N 1/4072; H04N 1/64; H04N
1/62
USPC ..... 358/1.1, 1.4, 1.5, 1.6, 1.7, 1.8, 1.9, 3.02,
358/3.03, 3.09, 3.1, 3.22, 3.23, 3.26, 1.17,
358/1.18, 502, 518, 296; 347/1, 3, 5, 6,
347/9, 12, 13, 14, 20, 37, 40, 42, 43, 44,
347/47; 346/45, 46, 49, 50, 78, 105, 141
See application file for complete search history.

(56) References Cited

U.S. PATENT DOCUMENTS

| | | | | |
|---|---|---|---|---|
| 7,347,523 | B2* | 3/2008 | Tatsumi | B41J 2/16579 347/14 |
| 7,367,644 | B2 | 5/2008 | Arazaki et al. | |
| 7,556,345 | B2* | 7/2009 | Suzuki | B41J 2/2132 347/14 |
| 7,787,147 | B2* | 8/2010 | Yoshida et al. | 358/1.8 |
| 7,862,140 | B2* | 1/2011 | Yoshida et al. | 347/19 |
| 8,411,326 | B2* | 4/2013 | Inoue | B41J 2/155 358/1.13 |
| 8,444,244 | B2* | 5/2013 | Araki | B41J 29/393 347/19 |
| 8,510,617 | B2* | 8/2013 | Naka | B41J 2/2132 358/1.9 |
| 8,529,006 | B2* | 9/2013 | Goto et al. | 347/14 |
| 8,585,174 | B2* | 11/2013 | Saita | B41J 2/2142 347/19 |
| 8,743,420 | B2* | 6/2014 | Ishikawa | H04N 1/6041 358/1.9 |
| 8,955,937 | B2* | 2/2015 | Metcalfe et al. | 347/14 |
| 8,985,724 | B2* | 3/2015 | Takagi | B41J 29/38 347/14 |
| 9,694,598 | B2* | 7/2017 | Ishikawa | B41J 2/2139 |
| 2003/0085950 | A1* | 5/2003 | Yashima | B41J 2/2139 347/43 |
| 2005/0052483 | A1* | 3/2005 | Esaki | B41J 3/4071 347/12 |
| 2005/0174374 | A1* | 8/2005 | Ebihara et al. | 347/13 |
| 2006/0284928 | A1* | 12/2006 | Park | B41J 2/04513 347/42 |
| 2008/0106564 | A1* | 5/2008 | Lifshitz | B41J 2/085 347/15 |
| 2009/0174887 | A1* | 7/2009 | Arazaki | H04N 1/405 358/1.9 |
| 2010/0079816 | A1* | 4/2010 | Inoue | B41J 2/155 358/3.23 |
| 2011/0242173 | A1* | 10/2011 | Zama | B41J 2/2142 347/13 |
| 2013/0076823 | A1* | 3/2013 | Nomura et al. | 347/14 |

FOREIGN PATENT DOCUMENTS

| | | |
|---|---|---|
| JP | 3294008 B2 | 6/2002 |
| JP | 2003-231245 A | 8/2003 |
| JP | 2007-098937 A | 4/2007 |
| JP | 2010-082971 A | 4/2010 |
| JP | 2011-255593 A | 12/2011 |

* cited by examiner

RECORDING SYSTEM, RECORDING APPARATUS, INFORMATION PROCESSING APPARATUS, AND RECORDING CONTROL METHOD THAT SHIFT RANGE OF RECORDING ELEMENTS

BACKGROUND OF THE INVENTION

Field of the Invention

The present invention relates to a recording system, a recording apparatus, an information processing apparatus, and a recording control method, and more particularly, to a recording system which includes a recording apparatus having recording heads mounted therein and an information processing apparatus connected to the recording apparatus, and a recording control method used in the recording system.

Description of the Related Art

In general, a recording apparatus using an inkjet recording head (hereinafter referred to as "recording head") may not carry out proper recording when the number of ejections of ink from nozzles of the recording head exceeds a predetermined value.

When a recording head has an electrothermal converter (heater) as an ink ejection energy generating unit, for example, heat generated from the electrothermal converter rapidly heats the ink to produce bubbles whose pressure causes ink droplets to be ejected from the nozzles. Such a thermal type recording head undergoes stress, such as heat, pressure, or a chemical reaction with the ink, over a long period of usage. As a result, the resistance of the heater increases, or the rapid heat generation from the heater burns the ink, thus reducing the amount of ink ejection. This may prevent the ink from being properly ejected, lowering the quality of a recorded image.

Japanese Patent No. 3294008, for example, discloses the following scheme as a conventional way of avoiding such a situation. Specifically, in frequently recording images containing ruled lines or the like, the number of ejections of the ink from local nozzles of the recording head which records the images increases so that the service life of the local nozzles expires. To prevent such expiration of the service life, Japanese Patent No. 3294008 proposes the scheme of shifting an image to be recorded in the widthwise direction of sheet for each business form to be recorded, thereby preventing specific nozzles from being used in recording in a concentrated manner. Such a scheme is a technology effective particularly for a recording apparatus using the recording head having a plurality of nozzles arrayed in the widthwise direction of sheet to prevent concentrated use of local nozzles which originates from recording of ruled lines or the like, thereby prolonging the service life of the recording head.

By way of contrast, a recording apparatus using a recording head which ejects ink from an ink passage forming a plurality of nozzles causes uneven density in a recorded image due to the influence of a fine variation in the shape of the ink passage which forms nozzles, a change in the amount of ejection of the ink as a recording agent, and the like.

Such uneven density is overcome by a technology called head shading (HS) as disclosed in, for example, Japanese Patent Application Laid-Open No. H10-000764 as one of correction methods of making the density uniform through correction of image signals or correction of parameters at the time of image processing.

Highly accurate correction using the head shading technology requires that a host should execute correction with the positions of nozzles from which ink is ejected in mind at the time of generating image data. There is thus a problem in that, when the amount of image shift changes abruptly due to, for example, interruption of a job, image shift which cannot be identified in the head shading processing is performed so that the correction is not reflected properly.

SUMMARY OF THE INVENTION

The present invention has been made in view of the above-mentioned related art example, and provides a recording system, a recording apparatus, an information processing apparatus, and a recording control method which ensures high-quality image recording based on the head shading while efficiently reducing a load on specific nozzles of a recording head.

The recording system according to one embodiment of the present invention has the following configuration.

According to one embodiment of the present invention, there is provided a recording system, including: a recording apparatus configured to perform recording according to image data using a recording head having a plurality of recording elements; and an information processing apparatus which is connected to the recording apparatus and configured to generate a print job and send the print job to the recording apparatus, the recording apparatus configured to shift a range of use of the plurality of recording elements in an array direction of the plurality of recording elements and set a plurality of ranges of use by a shifting, the information processing apparatus including: a head shading correction unit configured to execute, based on information indicating that the range of use by the plurality of recording elements is one of the plurality of ranges of use, head shading correction corresponding to the one of the plurality of ranges of use on image data; and a sending unit configured to send the image data subjected to the head shading correction to the recording apparatus, the recording apparatus having a recording control unit configured to perform control in such a way that the recording head performs recording at the one of the plurality of ranges of use by using the image data subjected to the head shading correction.

Further, according to one embodiment of the present invention, there is provided an information processing apparatus configured to generate image data and send the image data to a recording apparatus which performs recording using a recording head having a plurality of recording elements and is configured to shift a range of use of the plurality of recording elements in an array direction of the plurality of recording elements and set a plurality of ranges of use a shifting, the information processing apparatus including: a head shading correction unit configured to execute, based on information indicating that the range of use of the plurality of recording elements is one of the plurality of ranges of use, head shading correction corresponding to the one of the plurality of ranges of use on the image data; and a sending unit configured to send the image data subjected to the head shading correction to the recording apparatus.

Further, according to one embodiment of the present invention, there is provided a recording apparatus configured to perform recording using a recording head having a plurality of recording elements based on image data generated by an information processing apparatus, the recording apparatus including: a recording unit configured to shift a range of use of the plurality of recording elements in an array direction of the plurality of recording elements and set a plurality of ranges of use by a shifting; a reception unit configured to receive, from the information processing apparatus, image data on which head shading correction corresponding to one of the plurality of ranges of use is executed; and a recording control unit configured to perform control in such a way that the recording unit performs recording at the one of the plurality of ranges of use based on the image data received by the reception unit and subjected to the head shading correction corresponding to the one of the plurality of ranges of use.

Further, according to one embodiment of the present invention, there is provided a recording control method used in a recording system, the recording system including: a recording apparatus configured to perform recording on a recording medium using a recording head having a plurality of recording elements, shift a range of use of the plurality of recording elements in an array direction of the plurality of recording elements and set a plurality of ranges of use by a shifting; and an information processing apparatus which is connected to the recording apparatus and configured to generate a print job and send the print job to the recording apparatus and configured to perform recording control on the recording apparatus, the recording control method comprising: executing, based on information indicating that the range of use by the plurality of recording elements is one of the plurality of ranges of use, head shading correction corresponding to the one of the plurality of ranges of use on image data; sending the image data subjected to the head shading correction from the information processing apparatus to the recording apparatus; and allowing the recording apparatus to perform recording by the one of the plurality of ranges of use by the recording head based on the image data subjected to the head shading correction.

Accordingly, according to one embodiment of the present invention, it is possible to record a high-quality image reflecting the result of proper correction of uneven density.

Further features of the present invention will become apparent from the following description of exemplary embodiments with reference to the attached drawings.

DESCRIPTION OF THE EMBODIMENTS

First Embodiment

Now, referring to FIGS. 1 to 11, a description will be provided of a first embodiment of the present invention more specifically and in detail.

The term "record" (hereinafter sometimes referred to as "print") used herein means formation of not only significant information such as characters and figures, but also insignificant information. Further, the term represents formation of an image, a design, a pattern, or the like on a recording medium, or processing of a medium in a broad sense, regardless of whether such is apparent as being visibly sensible by persons.

The term "recording medium" represents not only a sheet of paper which is used for an ordinary recording apparatus, but also any medium on which ink is applicable, such as cloth, plastic film, metal plate, glass, ceramics, wood, or leather, in a broad sense.

Further, the term "ink" (hereinafter sometimes referred to as "liquid") should be broadly interpreted like the above-mentioned definition of "record (print)." Therefore, the term "ink" represents liquid which is applied to a recording medium to form an image, a design, a pattern, or the like, or process a recording medium, or to processing with ink (for example, solidification or insolubilization of a coloring material in ink to be applied to a recording medium).

Further, the term "recording element" generally represents any element which generates energy to be used in an ejection port or a liquid passage connected thereto, or ink ejection, unless otherwise specified.

General Outline of Recording System (FIGS. 1 to 4)

Figure 1:
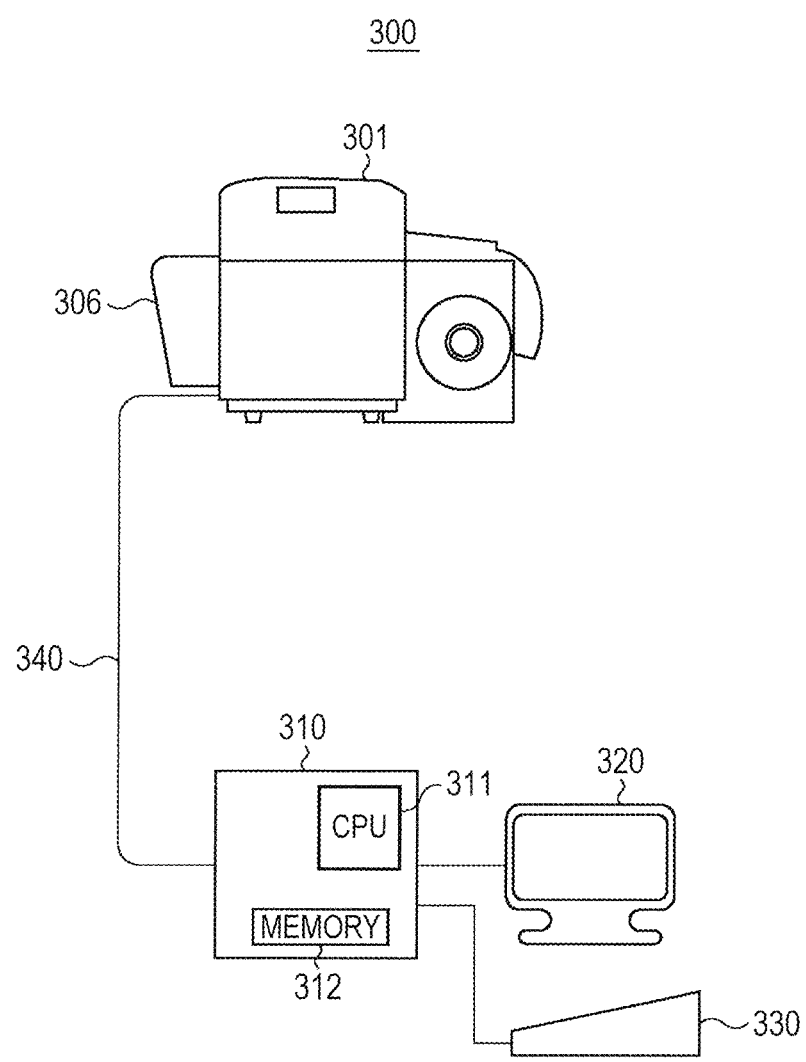
FIG. 1 is a block diagram illustrating the outline of the configuration of a recording system according to an exemplary first embodiment of the present invention.

FIG. 1 is a block diagram illustrating the outline of the configuration of a recording system according to the exemplary first embodiment of the present invention. As illustrated in FIG. 1, a recording system 300 includes a recording apparatus 301 having inkjet recording heads mounted thereon, and a personal computer (PC) 310 connected to the recording apparatus 301 by a USB cable 340 or the like. The PC 310 is hereinafter referred to as "host" or "information processing apparatus."

The host 310 is connected to a display 320 which displays various kinds of information, and an instruction unit 330 including a keyboard and a pointing device which provides the host 310 with instructions. The host 310 also includes a CPU 311 which runs various programs, and a memory 312 which stores those programs and data. The memory 312 includes a semiconductor memory, such as ROM or RAM, and a hard disk or the like.

An inkjet recording apparatus 301 is controlled by the host 310. Therefore, a printer driver (a kind of control program) which operates the inkjet recording apparatus 301 to perform recording control thereon, and an application which generates image data are installed on the host 310. When the printer driver is executed by the CPU 311 at the time of recording, the display 320 of the host 310 displays various menu screens associated with the recording operation. Of course, the host 310 generates a print job and image data to be printed, and supplies the image data to the inkjet recording apparatus 301 as a print job. At this time, the host 310 converts the generated image data to a form interpretable by the inkjet recording apparatus 301 using the printer driver, and sends the converted image data to the inkjet recording apparatus 301.

The inkjet recording apparatus 301 records an image on a recording medium based on the image data and a control signal from the host 310.

Although the configuration illustrated in FIG. 1 has the host 310 and the inkjet recording apparatus 301 connected together by the USB cable, the connection is not limited thereto. For example, the host 310 and the inkjet recording apparatus 301 may be connected by a LAN cable or a radio interface. Note that, the general configuration of the recording system 300 illustrated in FIG. 1 is just an example, and the recording system 301 may be configured to have a plurality of information processing apparatus 310 and a plurality of recording apparatus 301. In addition, other apparatus than those mentioned may be connected to the recording system 301.

Figure 2:
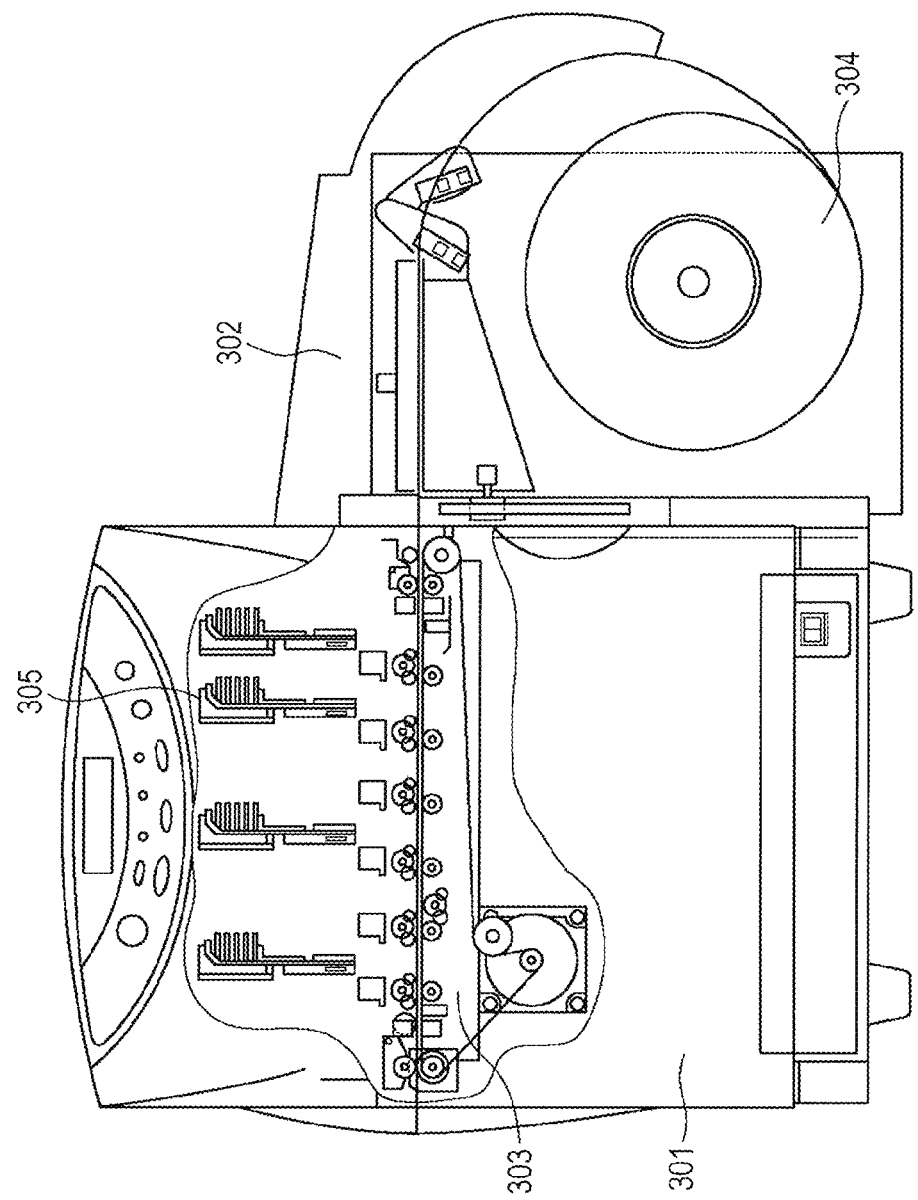
FIG. 2 is an external perspective view illustrating the outline of the configuration of an inkjet recording apparatus included in the recording system illustrated in FIG. 1.

FIG. 2 is an internal side view illustrating the outline of the configuration of the inkjet recording apparatus (hereinafter referred to as "recording apparatus") included in the recording system illustrated in FIG. 1.

The recording apparatus 301 includes four full-line recording heads (hereinafter referred to as "recording head") 305 which eject yellow (Y) ink, magenta (M) ink, cyan (C) ink, and black (K) ink, respectively. The recording head 305 has a plurality of nozzles to eject ink arranged in a direction crossing the direction of conveying a recording sheet. Further, the recording apparatus 301 includes a print buffer memory (hereinafter referred to as "VRAM") which temporarily stores image data of each color sent from the host 310, and executes the following recording operation when bit mapping of image data in the VRAM finishes. That is, the recording apparatus 301 operates a roll holder 302 and a conveying unit 303 to feed a recording sheet 304 which is a roll of continuous paper, and ejects the individual YMCK inks according to the contents of the VRAM to effect recording.

The VRAM of the recording apparatus 301 has the capacity to store sufficient image data for recording an image with a predetermined length in the direction of conveying the recording sheet. The capacity is what is needed for bit mapping of image data of 297 mm in length (i.e., size A4) in the conveying direction when, for example, the recording width of the recording head 305 is 210 mm. Therefore, the VRAM can be said as a page memory or frame memory.

Further, the recording apparatus 301 receives various kinds of setting data, such as the type of the sheet, the types of the inks, and an image data size.

Figure 3:
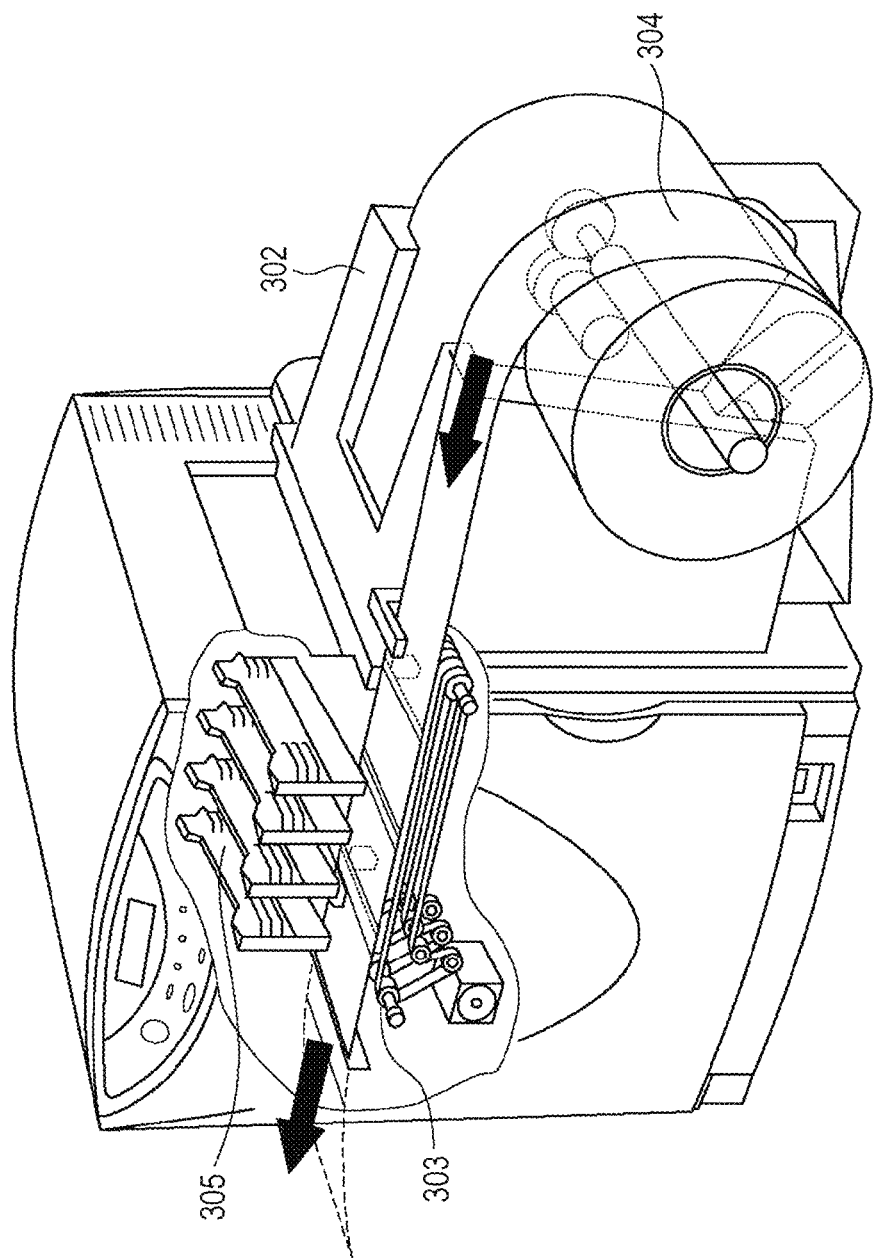
FIG. 3 is a perspective view schematically illustrating the recording sheet feeding operation of the recording apparatus illustrated in FIG. 2.

FIG. 3 is a perspective view schematically illustrating the recording sheet feeding operation of the recording apparatus 301 illustrated in FIG. 2.

Referring to FIG. 3, the recording sheet 304 is inserted into the conveying unit 303 from the roll holder 302 to convey the recording sheet 304 in a direction of recording an image (direction of arrows in FIG. 3) by the conveying force from the conveying unit 303. This operation is referred to as "feeding operation."

When mapping of the image data into the VRAM finishes, the recording heads 305 are driven in synchronism with the feeding operation to effect recording on the recording sheet 304 based on the image data mapped in the VRAM.

Although the recording medium is a roll of recording paper in FIGS. 1 to 3, cut sheets may be used as the recording medium. When a roll of recording paper is used, recording in a predetermined length in the direction of conveying the recording sheet is treated as one page, but for cut sheets, the actual sheet length can be counted as one page.

Figure 4:
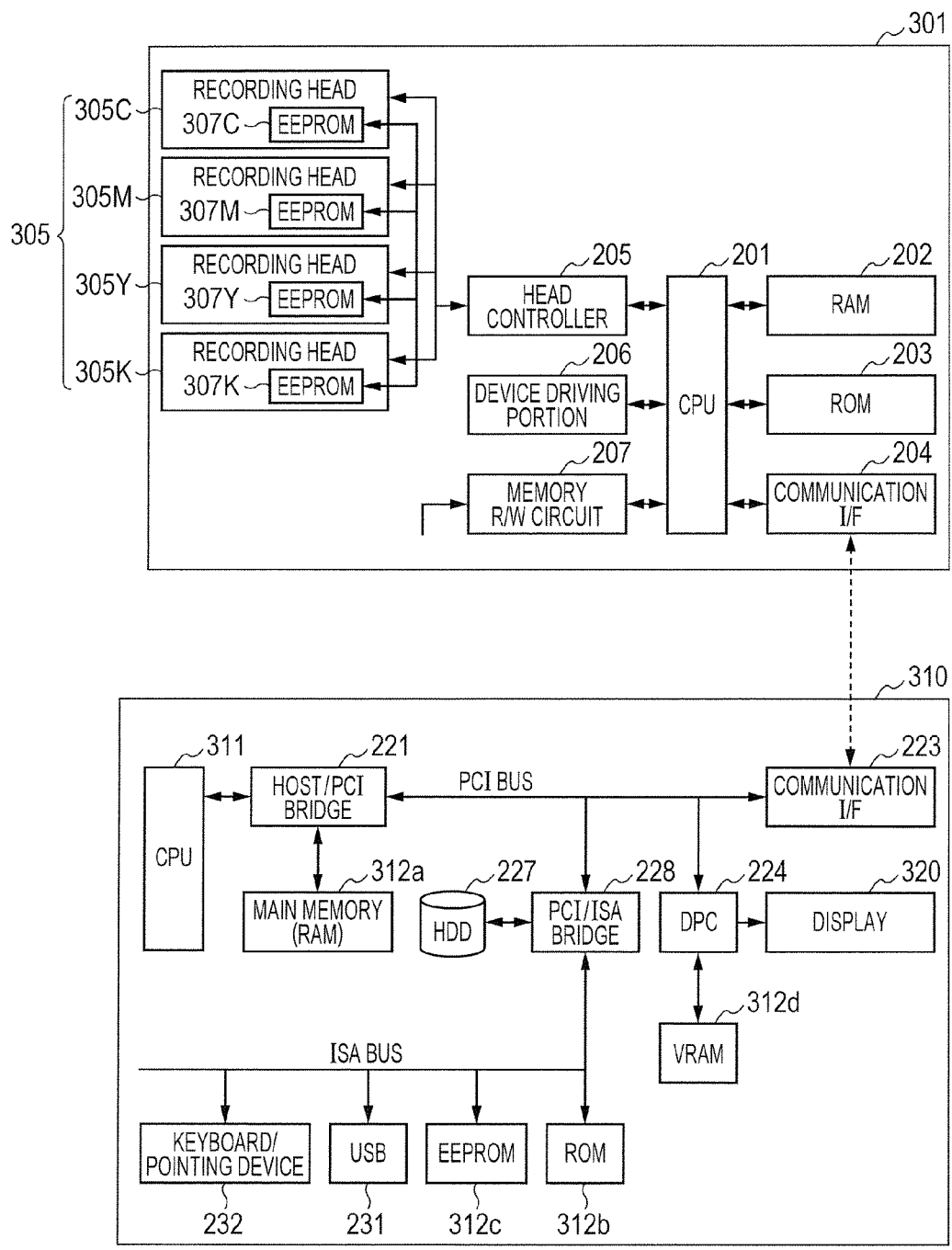
FIG. 4 is a block diagram illustrating the control structures of the inkjet recording apparatus and an information processing apparatus which constitute the recording system.

FIG. 4 is a block diagram illustrating the control structure of each of the inkjet recording apparatus 301 and the information processing apparatus 310 which constitute the recording system 300. FIG. 4 does not illustrate all the components of the inkjet recording apparatus 301 and the information processing apparatus 310, but illustrate only those components which are associated with the present invention.

The CPU 311 in the information processing apparatus 310 executes various programs under control of an operating system (OS). As illustrated in FIG. 4, the system bus of the CPU 311 forms hierarchical buses with a PCI bus and an ISA bus as local buses, respectively through a host/PCI bridge 221 and a PI/ISA bridge 228, and is connected to the individual components by the buses.

The system bus of the CPU 311 is provided with a fast memory (not shown) called "L2 cache" to store codes, data and the like which are normally accessed by the CPU 311.

A main memory (RAM) 312a is used as a temporary storage area for the OS, an application program (hereinafter referred to as "application"), the printer driver, or the like, and also as a work area configured to execute each program. The RAM 312a also stores RGB image data generated by the application, multiple-value density image data of individual color components corresponding to the respective recording heads of the recording apparatus 301 generated based on the RGB image data, or the like. According to the first embodiment, the image data includes cyan image data, magenta image data, yellow image data, and black image data.

Image data which is corrected based on head shading (HS) correction data further obtained and image data digitized by an error diffusion method or the like are all mapped in the RAM 312a, and are transferred to the recording apparatus 301 via a communication interface (I/F) 223.

The communication I/F 223 is connected to the PCI bus, and serves to interface for, for example, a USB, LAN network and the like.

A video controller (DPC) 224 continuously reads bit map data for display, which is written in a VRAM 312d by the CPU 311, and continuously transfers the bit map data to the display 320 such as LCD or PDP.

The ROM 312b stores programs such as a BIOS program which controls input/output devices, such as a keyboard/pointing device 232 and a USB memory 231, and programs which execute initialization and self-diagnosis when powered ON. An EEPROM 312c stores various parameters which are permanently used, such as recording characteristic data of the recording heads.

The OS, various application programs, and the printer driver for the recording apparatus 301 are read out from a hard disk (HDD) 227 into the RAM 312a, and are executed.

The recording apparatus 301 is controlled as a CPU 201 executes a control program to be described later stored in a ROM 203. The recording apparatus 301 includes a RAM 202 which stores image data, a communication I/F 204 for communication to/from the information processing apparatus 310, and a head controller 205 which controls driving of the recording heads 305. The recording apparatus 301 further includes a device driving portion 206 which controls driving of actuators and the like which convey the recording medium.

Further, the recording heads 305 of the recording apparatus 301 include four recording heads 305C, 305M, 305Y, and 305K which eject cyan ink, magenta ink, yellow ink, and black ink, respectively. The recording heads 305C, 305M, 305Y, and 305K respectively include EEPROMs (nonvolatile memories) 307C, 307M, 307Y, and 307K each storing HS correction data. Those pieces of HS correction data are read/written by a memory control (R/W) circuit 207. Recording head IDs and HS correction data are written in those EEPROMs beforehand. Each recording head ID does not conflict with the IDs of the recording heads which eject inks of the other colors.

Although the RAM serves as the main memory and the HDD serves as a large-capacity storage device in the above description, the present invention is not limited to this particular case. For example, other devices such as FeRAM and MRAM may be used as the main memory, and a semiconductor magnetic memory medium (SDD) or an optical disc (magneto-optical disk such as MO or PD, CD-RW, DVD-RAM, DVD-RW, or DVD+RW) or the like may be used instead of the HDD.

In addition, the communication interface is not limited to the USB and LAN interface; for example, a serial interface based on the IEEE 1394 or the like, or a parallel interface based on the IEEE 1284 or the like may be used instead.

Figure 5:
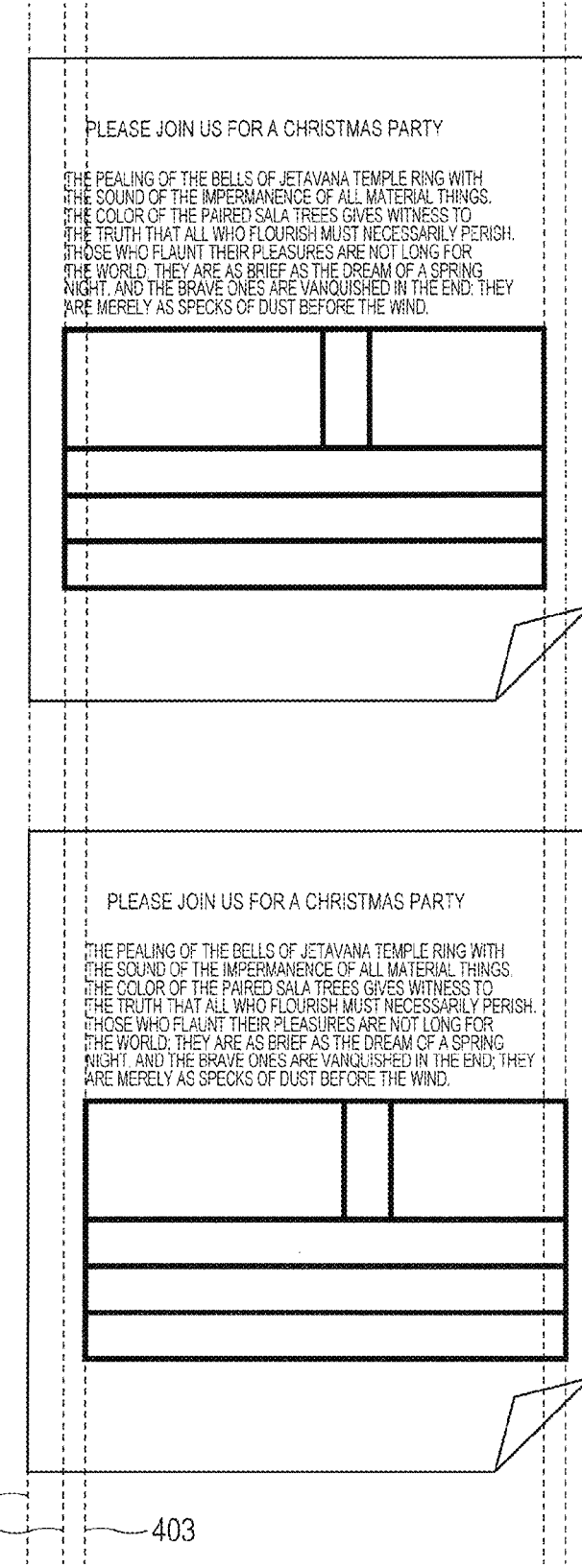
FIG. 5 is a diagram illustrating image shift which is normally executed.
Figure 6:
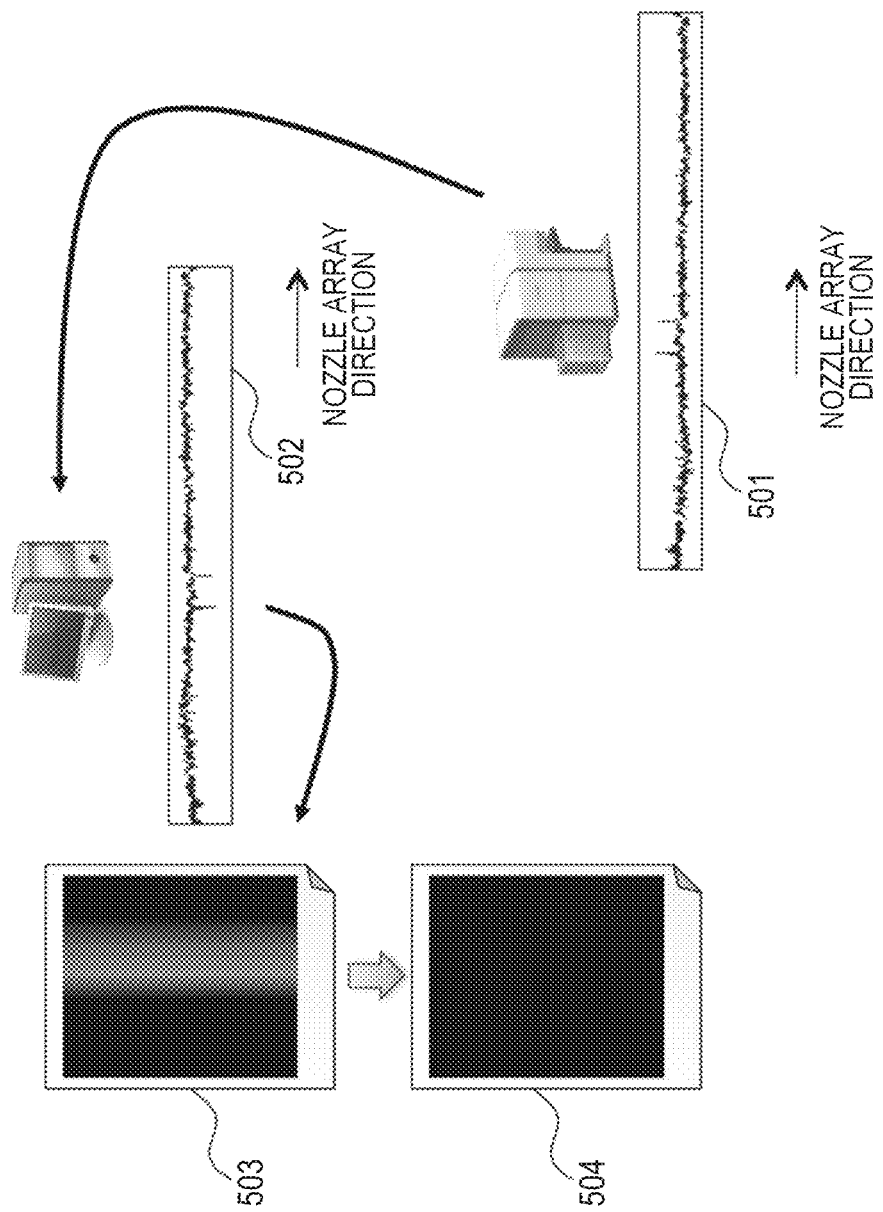
FIG. 6 is a diagram illustrating a head shading (HS) processing which is normally executed.

Descriptions of Image Shift Processing and HS Processing (FIGS. 5 and 6)

FIG. 5 is a diagram illustrating image shift which is normally executed.

As illustrated in FIG. 5, a sheet position 401 for each page does not change unless the conveyance of the recording sheet is properly carried out in the recording apparatus 301, but print start positions (recording positions) 402 and 403 for an image on each page change page by page. This is an image shift.

In shifting and recording an image, as illustrated in FIG. 5, the image is shifted horizontally (in the nozzle array direction of the recording heads) within the recording sheet, and recorded.

FIG. 6 is a diagram illustrating a head shading (HS) processing which is normally executed.

As illustrated in FIG. 6, a density 501 of an image to be recorded with the inks ejected from all the nozzles of the recording heads vary in the nozzle array direction depending on the difference in the characteristics of the individual nozzles. The density 501 of an image is also called "information of uneven density." When a correction parameter 502 for a variation in density, which has a value in the opposite direction to such a variation in density is generated, and is applied to an image 503 having an uneven density, an image 504 which does not have an uneven density is obtained.

Such a process of performing correction corresponding to each nozzle in the array of nozzles of the recording head is called "HS processing" or "HS correction." In the HS processing, the correction parameter 502 is added to the original image data as illustrated in FIG. 6 to cancel out the uneven density. Because the characteristics of the recording heads in the recording apparatus 301 change with time, the density of a recorded image is measured regularly, and the correction parameter 502 is generated based on the measured density, and is stored inside the recording apparatus 301 as information of uneven density of nozzles. The information of uneven density of nozzles can be said to be information reflecting the recording characteristics of the recording heads.

A description will hereinafter be provided of Example 1 of the recording operation which involves HS correction and image shift which are executed by the recording system 300 with the above-described configuration.

Example 1

Figure 7:
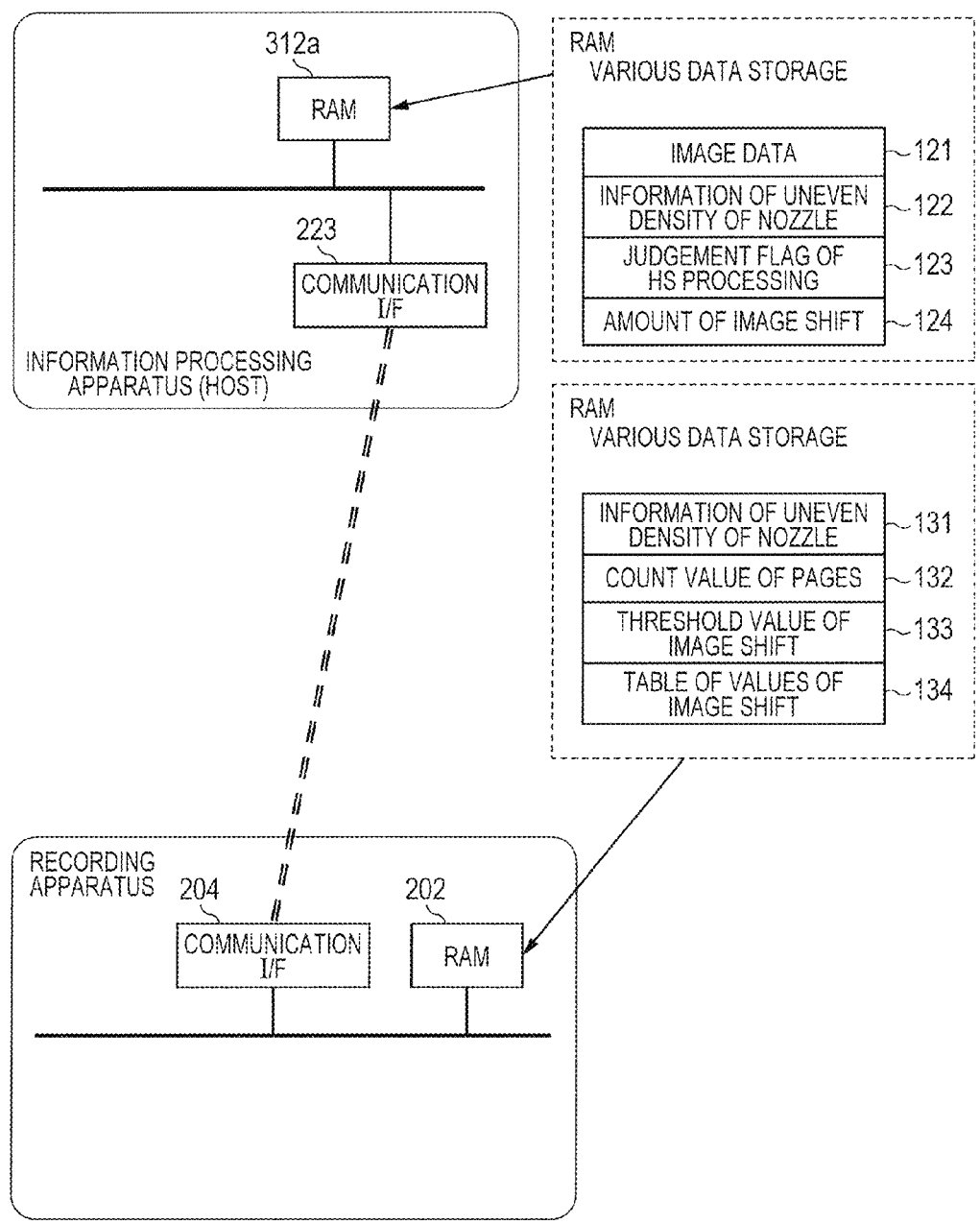
FIG. 7 is a diagram illustrating data stored in RAMs of the information processing apparatus and the recording apparatus to execute a recording operation according to Example 1 of the present invention.

FIG. 7 is a diagram illustrating data stored in respective RAMs of the information processing apparatus 310 and the recording apparatus 301 to execute the recording operation according to Example 1 of the present invention.

As illustrated in FIG. 7, the RAM 312a of the information processing apparatus 310 stores image data 121 to be used in recording, information of uneven density of nozzle 122 of the recording apparatus 301, a judgement flag of HS processing 123 for judging whether to execute HS processing, an amount of image shift 124 acquired by the recording apparatus 301, and the like. The RAM 202 of the recording apparatus 301 stores information of uneven density of nozzle 131, a count value of printed pages 132, a threshold value of image shift 133 at the time of executing image shift, a table of values of image shift 134, which defines a plurality of amounts of image shift, and the like. The RAM 202 of course stores image data to be used in recording in addition thereto.

The threshold value of image shift is the number of printed pages which should be subjected to image shift by a new amount of image shift by the recording head. For example, the threshold value of image shift is set to a value "1,000." The value is defined as a threshold value for preventing occurrence of improper recording due to deterioration of nozzles or the like originating from, for example, concentrated ejection of ink from the same recording element (nozzle) in continuous recording of ruled lines, unless the new amount of image shift is set.

Because HS processing itself is normally executed in the recording system 300, the description of the details of the processing is omitted.

The information processing apparatus 310 obtains information of uneven density of nozzle stored in the recording apparatus 301, and stores the information in the RAM 312a. When the information processing apparatus 310 determines that HS correction should be executed based on the information of uneven density of nozzle obtained from the recording apparatus 301, the judgement flag 123 for judging whether or not to execute HS processing is set on. When the information processing apparatus 310 determines that an uneven density occurs on a recorded image based on the information of uneven density of nozzle, the information processing apparatus 310 sets the judgement flag 123 on. When the information processing apparatus 310 determines that an uneven density does not occur, on the other hand, the information processing apparatus 310 sets the judgement flag 123 off. In any case, this flag is set before image data is generated and sent to the recording apparatus 301. In this manner, the information of uneven density of nozzle of the recording apparatus is reflected on HS processing which is carried out by the information processing apparatus 310.

Next, the image processing and the recording operation according to Example 1 will be described referring to associated flowcharts. First, the processing on the information processing apparatus 310 side will be described, and then the processing on the recording apparatus 301 side will be described.

Figure 8:
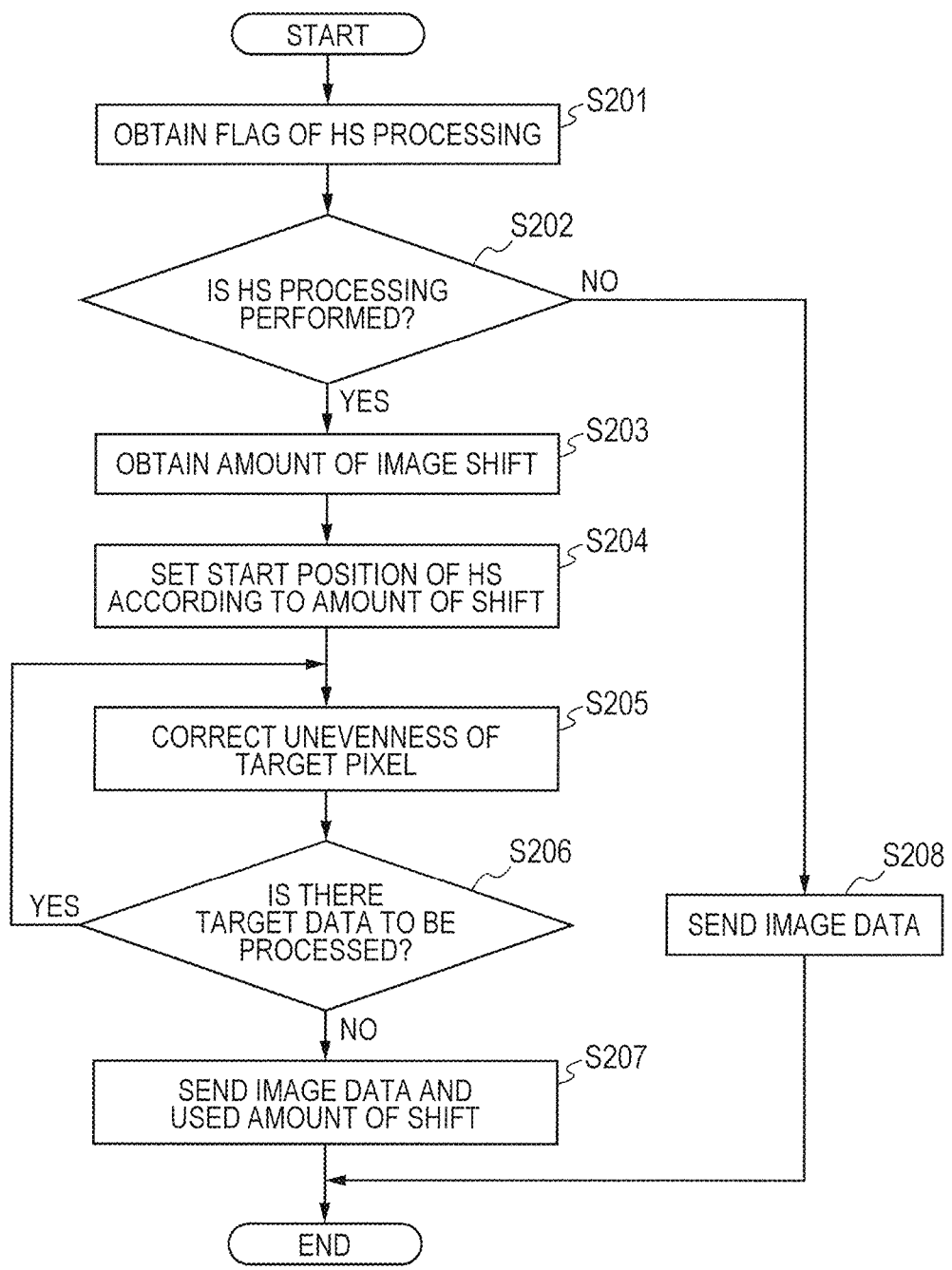
FIG. 8 is a flowchart illustrating image processing which is executed by the information processing apparatus.

FIG. 8 is a flowchart illustrating image processing which is executed by the information processing apparatus 310.

First, when an application is executed to generate image data, based on which the printer driver executes image processing, the judgement flag 123 for judging whether or not to execute HS processing is obtained in Step S201. In next Step S202, the information processing apparatus 310 determines whether HS processing is to be executed according to the value of the judgement flag 123.

When the information processing apparatus 310 determines based on the value of the judgement flag 123 that HS processing is to be executed, the processing proceeds to Step S203 where the amount of image shift 124 is obtained from the recording apparatus 301, and stored in the RAM 312a. In Step S204, the information processing apparatus 310 sets the start position of HS processing according to the amount of image shift 124, and determines an address position at which the information of uneven density of nozzle 131 to be referred to is stored, based on the start position. That is, the range of use of the nozzles corresponding to the recording position when the recording apparatus 301 has executed image shift is associated with the image data. The range of use of the nozzles is the range of use of those nozzles in the array of nozzles of the recording head 305 which are used when image shift is executed, and the position of this range in the nozzle array direction changes according to a difference in the amount of image shift. The information of uneven density of nozzle is obtained from the recording apparatus 301 and stored in the RAM 312a beforehand. In Step S205, the information processing apparatus 310 corrects unevenness of target image data to be processed. In other words, the information processing apparatus 310 executes HS processing on image data corresponding to the range of use of the nozzles.

In Step S206, the information processing apparatus 310 checks whether there is image data to be subjected to HS processing, and repeats the process of Step S205 until no further target image data to be processed is present. After correction on every image data to be processed is executed, the used amount of image shift (shift amount) which is used in the current correction is sent as shift amount designating information, together with the image data, to the recording apparatus 301 in Step S207.

When the information processing apparatus 310 determines in Step S202 that HS processing is not executed, on the other hand, the processing proceeds to Step S208 where the image data generated by the application is sent directly to the recording apparatus 301.

Figure 9:
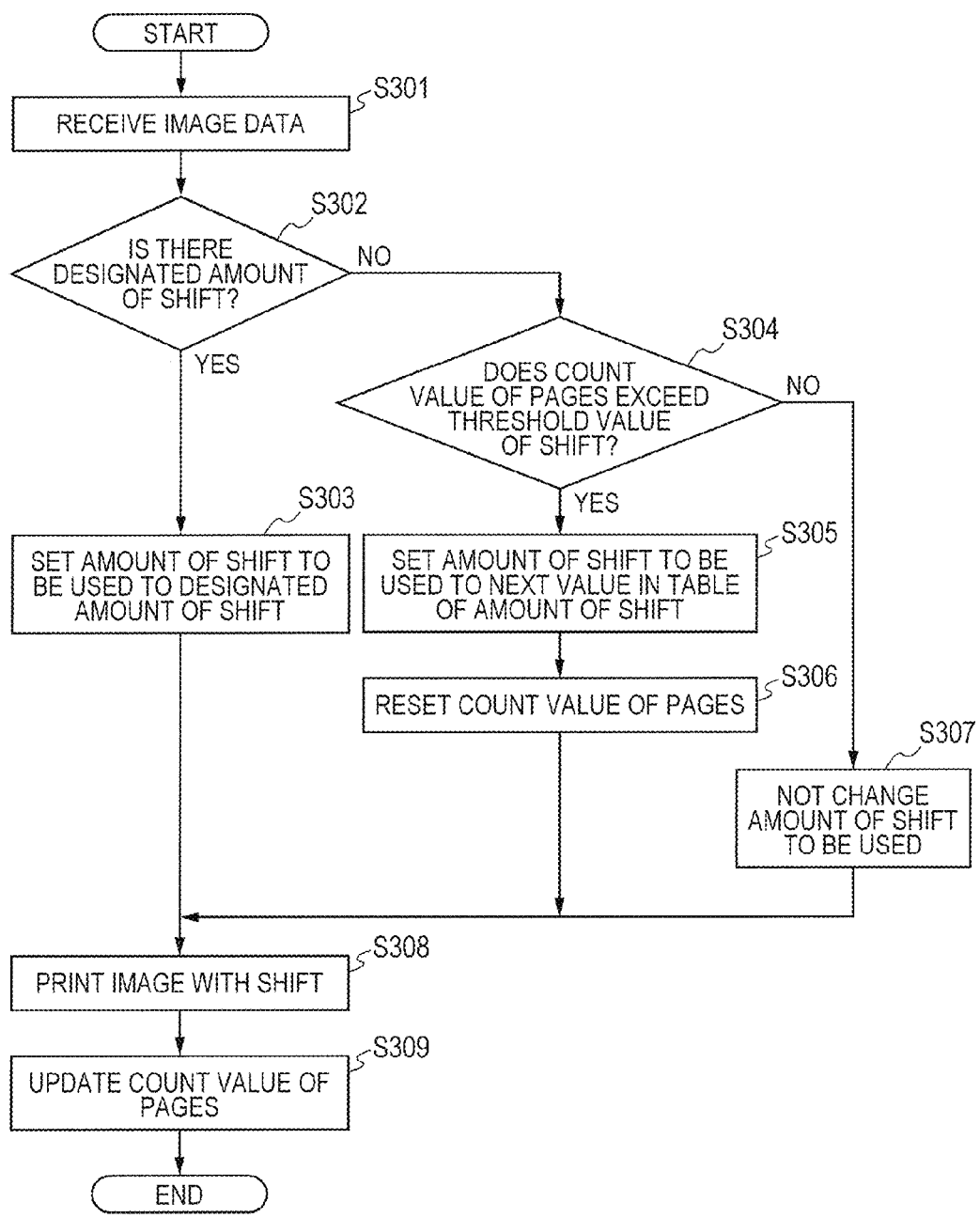
FIG. 9 is a flowchart illustrating the recording operation which is executed by the recording apparatus.

FIG. 9 is a flowchart illustrating recording operation which is executed by the recording apparatus 301.

First, the recording apparatus 301 receives the image data sent from the information processing apparatus 310 in Step S301, and checks whether the received image data contains the shift amount designating information in Step S302.

When the recording apparatus 301 determines that the shift amount designating information is contained, the processing proceeds to Step S303 where the recording apparatus 301 rewrites the amount of image shift used in recording with the value of the amount of image shift designated in the received image data. Recording based on the designated amount of image shift sent from the information processing apparatus 310 is executed by priority over recording based on the amount of image shift set by the recording apparatus 301.

When the recording apparatus 301 determines that the shift amount designating information is not contained in the received image data and image shift is not designated, the processing proceeds to Step S304 where the current count value of the page counter is compared with a threshold value of image shift to determine whether the count value exceeds the threshold value of image shift. Note that, the threshold value of image shift (STH) is read out from the ROM 203, and is stored in the RAM 202.

When the result of the comparison shows that the current count value (PCNT) of the page counter exceeds the threshold value of image shift (PCNT>STH), the processing proceeds to Step S305 where the recording apparatus 301 changes the amount of image shift used in recording to a next value set in the table of values of image shift 134. In next Step S306, the value of the page counter is reset. When the current count value (PCNT) of the page counter does not exceed the threshold value of image shift (PCNT≤STH), the processing proceeds to Step S307 where the recording apparatus 301 does not update the amount of image shift.

In Step S308, the recording apparatus 301 records an image while shifting the position of recording the image according to amount of image shift newly set, or according to the previous amount of image shift. In Step S309, the recording apparatus 301 updates the value of the page counter by the number of recorded pages (count-up).

According to Example 1 described above, therefore, the recording apparatus 301 can record an image while executing image shift according to the amount of image shift sent together with the image data from the information processing apparatus 310.

Example 2

Figure 10:
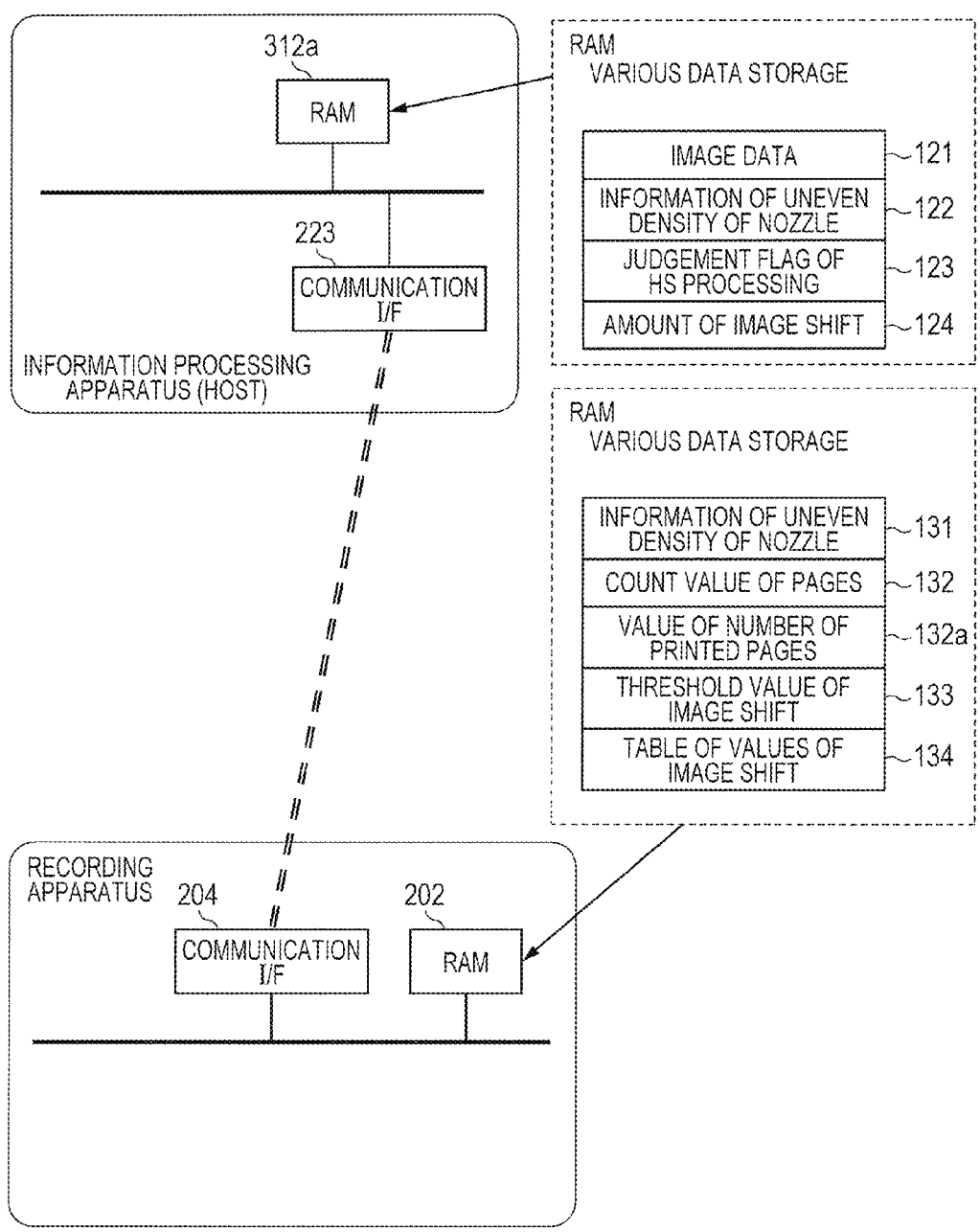
FIG. 10 is a diagram illustrating data stored in RAMs of an information processing apparatus and a recording apparatus to execute a recording operation according to Example 2 of the present invention.

FIG. 10 is a diagram illustrating data stored in RAMs of the information processing apparatus 310 and the recording apparatus 301 to execute the recording operation according to Example 2 of the present invention. In FIG. 10, the same reference numerals are given to the same data as described above referring to FIG. 7 to avoid repeating the redundant description. The following describes only data unique to Example 2.

As apparent from FIG. 10 in comparison with FIG. 7, data to be stored in the RAM 312a of the information processing apparatus 310 is the same as the data in Example 1. The RAM 202 of the recording apparatus 301 stores a value 132a representing the number of printed pages.

Because the processing which is executed by the information processing apparatus 310 in Example 2 is the same as the one described in Example 1 referring to FIG. 8, the description thereof is omitted, and only processing associated with the recording operation of the recording apparatus 301 will be described below referring to an associated flowchart. In Example 2, however, the information processing apparatus 310 sends image data together with information on the number of recorded pages indicating how many pages the recording takes.

Figure 11:
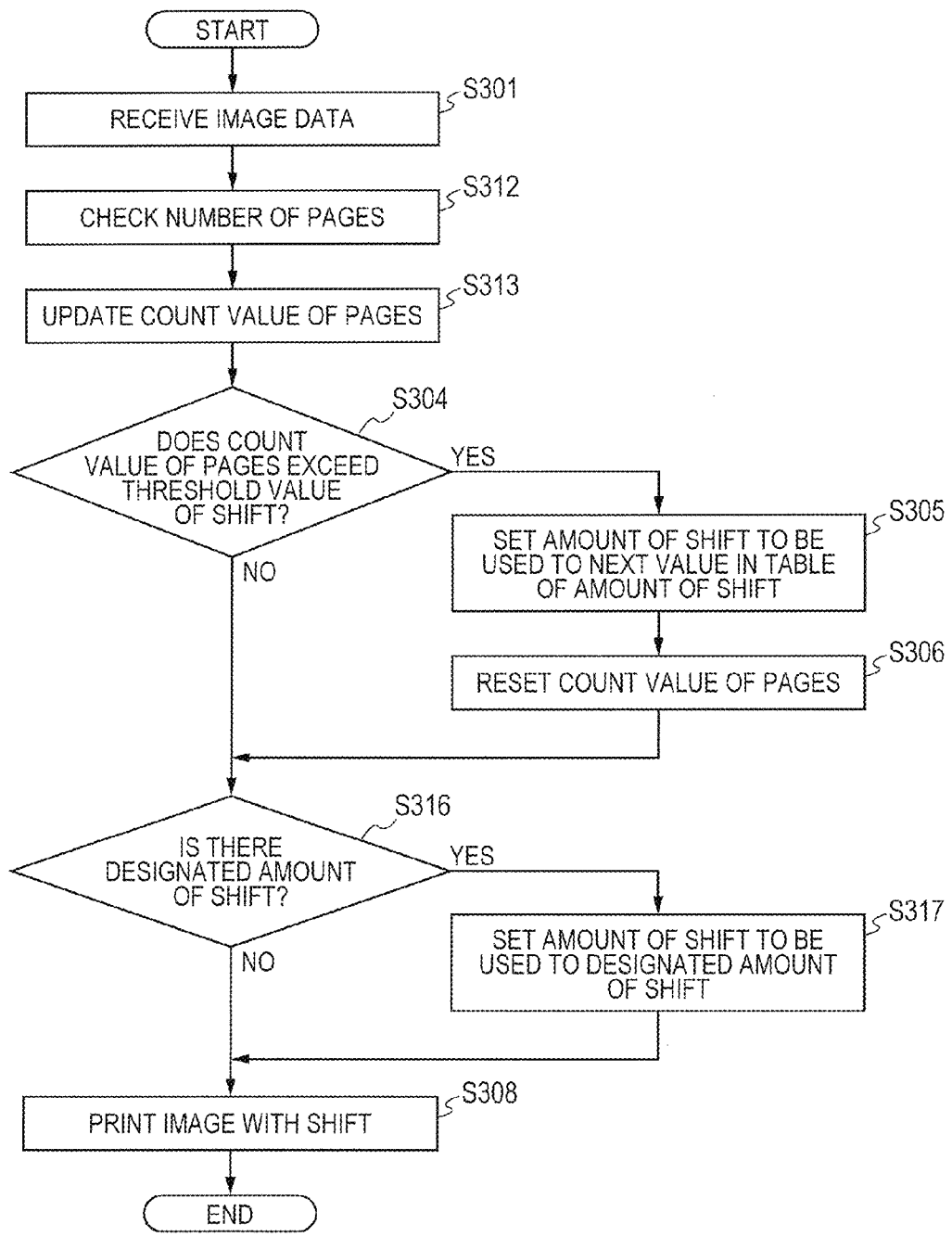
FIG. 11 is a flowchart illustrating the recording operation which is executed by the recording apparatus.

FIG. 11 is a flowchart illustrating the recording operation which is executed by the recording apparatus 301. In FIG. 11, the same step numbers are given to the same step processes as described above referring to FIG. 9 in Example 1 to avoid repeating the redundant description. The following describes only processes unique to Example 2.

When receiving image data sent from the information processing apparatus 310 in Step S301, the recording apparatus 301 checks the number of printed pages to find how many pages of images are to be recorded for the received image data. In Step S313, the number of pages is stored in the RAM 202 as the value of number of printed pages 132a.

The processes of Steps S304 to S306 are the same as those of Example 1.

When the current count value (PCNT) of the page counter exceeds the threshold value of image shift (PCNT>STH) in Step S304, or after the value of the page counter is reset in Step S306, the processing proceeds to Step S316. In Step S316, as in Step S302 of Example 1, the recording apparatus 301 checks whether the shift amount designating information is contained in the received image data.

When the recording apparatus 301 determines that the shift amount designating information is contained, the processing proceeds to Step S317 where the recording apparatus 301 rewrites the amount of image shift used in recording with the value of the amount of image shift designated in the received image data. On the other hand, when the recording apparatus 301 determines that the shift amount designating information is not contained in the received image data and image shift is not designated, the processing proceeds to Step S308.

In Step S308, the recording apparatus 301 records an image while shifting the position of recording the image according to the amount of image shift newly set, or according to the previous amount of image shift.

According to Example 2 described above, therefore, the number of printed pages is read ahead to update the value of the page counter, and hence information on image shift to be notified to the information processing apparatus 310 can be set to the latest value as compared with Example 1.

The present invention can also be achieved by executing the following processes. Specifically, the software (program) which achieves the functions of Example 1 is supplied to a system or an apparatus over a network or via various storage media, and the computer (or CPU, MPU, or the like) of the system or the apparatus reads and executes the program.

Second Embodiment

A second embodiment of the present invention will be described below in detail referring to FIGS. 12 to 22 and FIGS. 23A and 23B. Note that, the second embodiment described blow does not restrict the present invention as set forth in the appended claims, and not all of the combinations of the features of the second embodiment described below are essential to the solution of the present invention. Note that, the same reference numerals are given to the same components as those of the first embodiment as described above to avoid repeating the redundant description.

System Configuration

Figure 12:
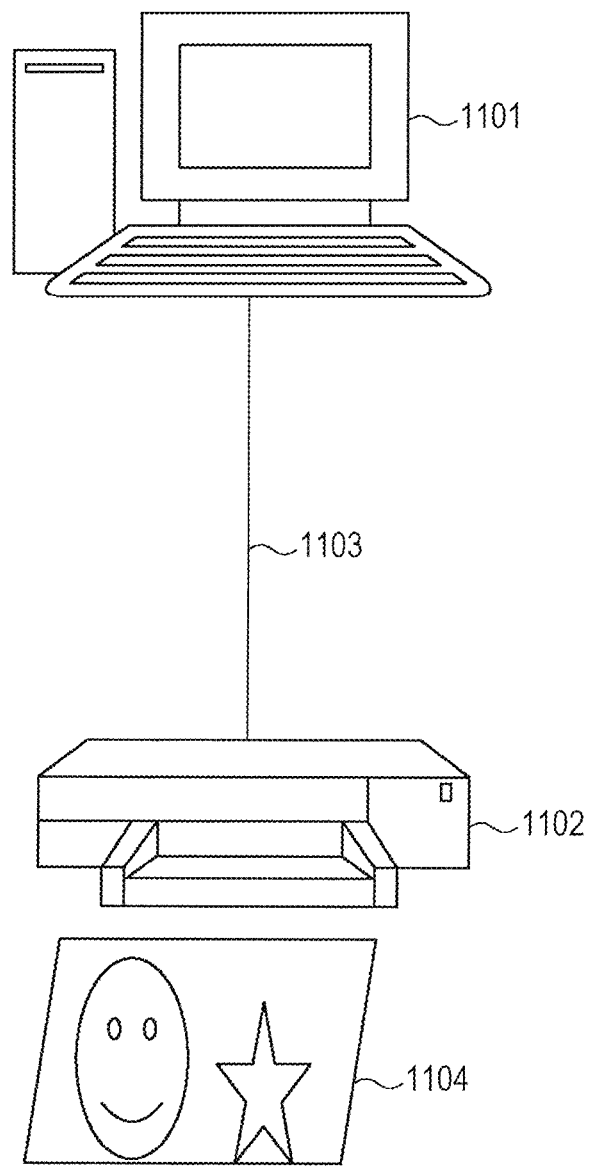
FIG. 12 is a diagram illustrating the configuration of a printing system.

FIG. 12 is a diagram illustrating the configuration of a printing system according to the second embodiment. The present printing system includes a host PC 1101 serving as a print controlling apparatus which generates print data, and a printing apparatus 1102 configured to execute a form overlay print according to an instruction sent from the host PC 1101. According to the second embodiment, an example of the printing apparatus 1102 will be described as an inkjet recording apparatus. The host PC 1101 and the printing apparatus 1102 can communicate with each other via a connection cable 1103. The printing apparatus 1102 executes a form overlay print on a recording medium 1104 such as a printing sheet based on form data and original data received from the host PC 1101. The form overlay print is a print system configured to create form data representing a form portion beforehand, and combining (overlaying) data to be retrofitted (original data), such as numerals and strings of characters, at predetermined locations of the form data. The form overlay print is also called "variable print".

Figure 13:
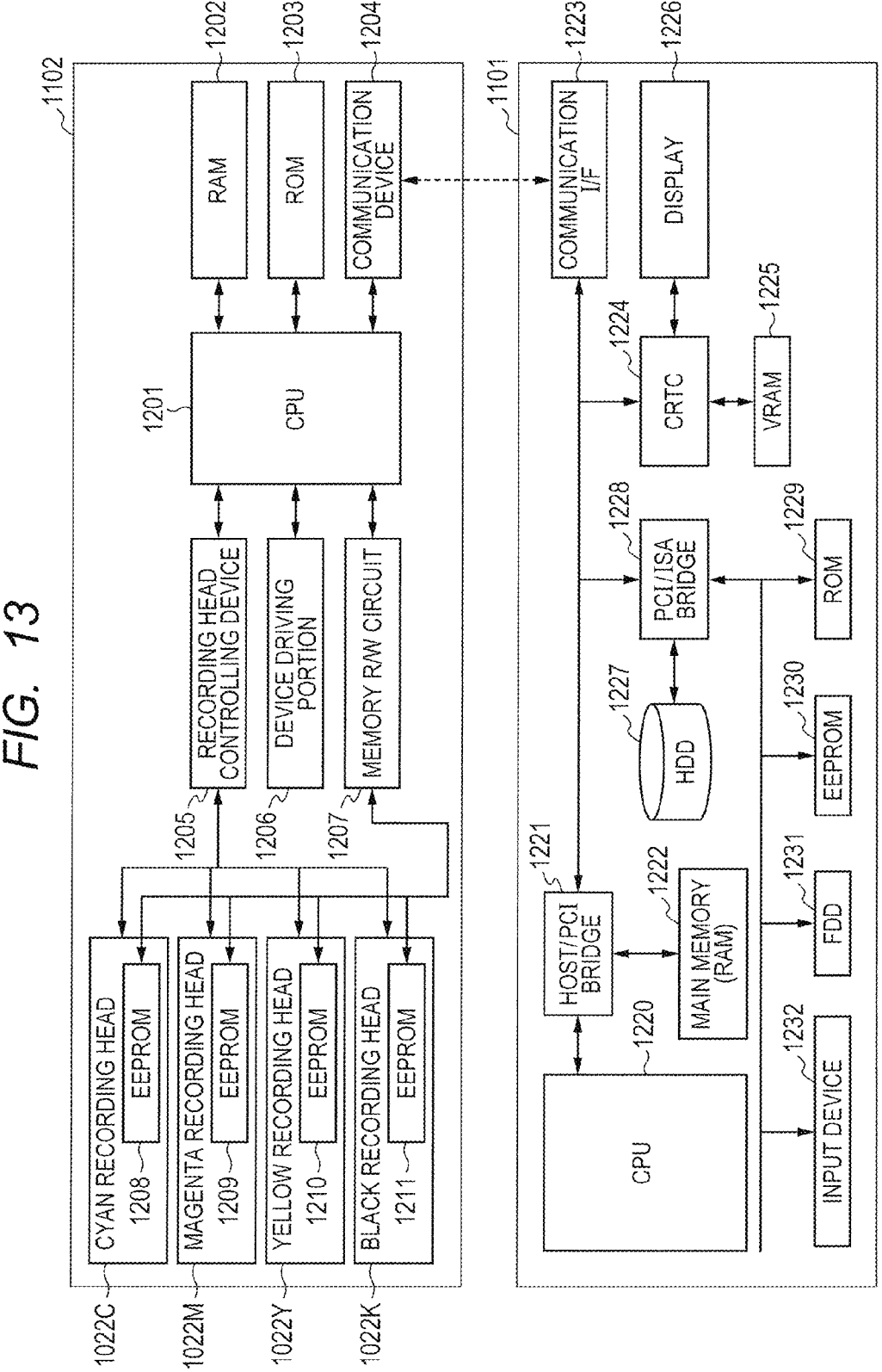
FIG. 13 is a diagram illustrating the internal block structures of a host PC and a printing apparatus.

FIG. 13 is a diagram illustrating the internal block structures of the host PC 1101 and the printing apparatus 1102. The host PC 1101 is, for example, an ordinary personal computer. A CPU 1220 executes various programs stored in the storage area such as a RAM under control of an operating system (OS) to achieve the operation of the second embodiment.

In the host PC 1101, a PCI bus and an ISA bus, which are local buses, are structured hierarchically through a host/PCI bridge 1221 and a PCI/ISA bridge 1228, to form, as a whole, a system bus. The individual blocks in the host PC 1101 send and receive data to and from each other via the system bus. The system bus is provided with a fast memory (not shown) called "L2 cache" to store codes, data and the like which are normally accessed by the CPU 1220.

A memory 1222 serves as a storage area configured to temporarily store an execution program including an operating system (OS), an application program, a printer driver, an execution program or the like. The memory 1222 is also used as a work memory area configured to execute each program. The memory 1222 also stores RGB image data written by an application program, ink color data converted from the RGB image data through color space conversion and corresponding to the individual ink colors of the respective recording heads of the printing apparatus 1102, and the like. In the second embodiment, the ink color data is multiple-value image data corresponding to the individual ink colors of cyan, magenta, yellow, and black.

Data which is corrected based on HS correction data obtained from the printing apparatus 1102, print data digitized by an error diffusion method, and the like are all mapped on the memory 1222. Then, those pieces of data are transferred to the printing apparatus 1102 via a communication interface (I/F) 1223. The communication I/F 1223 is, for example, a USB, a network, and the like, and is connected to the PCI bus.

A CRTC 1224 is a video controller which reads bit map data for display, which is written in a VRAM 1225 by the CPU 1220, and transfers the bit map data to a display 1226 such as a CRT, an LCD or a PDP. Through the display 1226, a user can recognize, for example, the progress of processing and the result of processing of the instructed print job.

A ROM 1229 stores a basic input-output system (BIOS) program which controls input/output devices such as an input device 1232 and an FDD 1231, programs which execute initialization and self-diagnosis when powered ON, and the like. The input device 1231 is a keyboard and a pointing device, for example. Using the input device 1232, the user can instruct, for example, printing on the printing apparatus 1102. An EEPROM 1230 is an electrically erasable and programmable nonvolatile memory configured to store various parameters which are permanently used, and stores, for example, recording characteristic data of the individual recording heads.

Figure 14:
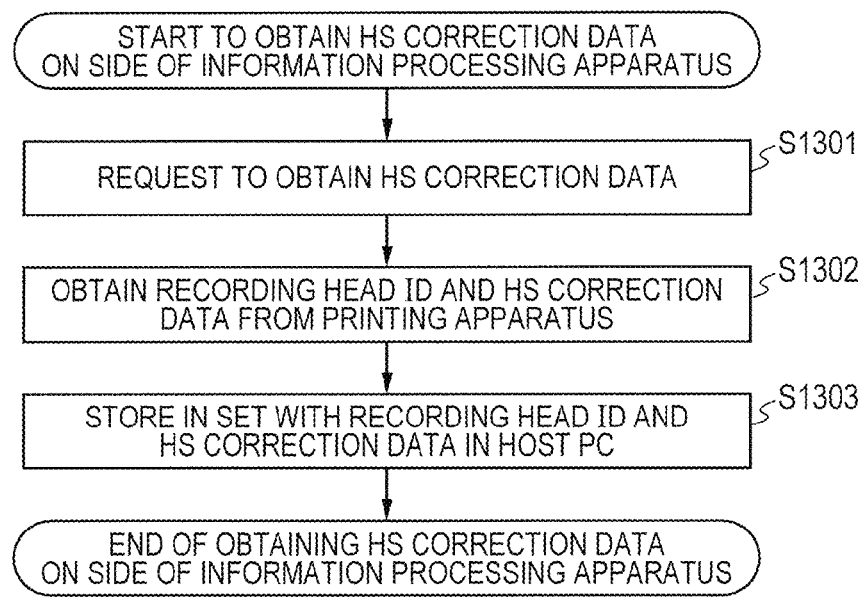
FIG. 14 is a flowchart illustrating procedures of a process when a sending request for HS correction data is made.

The OS, various application programs, a program which executes the individual processes illustrated in FIG. 14, the printer driver compatible to the printing apparatus 1102, and the like are read out from an HDD 1227 into the memory 1222, and are executed by the CPU 1220. A process of obtaining HS correction data illustrated in FIG. 14 may be automatically executed when the printing apparatus 1102 is newly connected to the host PC 1101, may be automatically executed when a recording head to be described later is replaced with another one by the user, or may be manually executed by the user at a desired timing.

The printing apparatus 1102 includes a ROM 1203 which stores print data or the like, a RAM 1202 which stores a control program, a communication device 1204 serving as an interface for communication to/from the host PC 1101, and a recording head controlling device 1205 which controls driving of the individual recording heads. The printing apparatus 1102 also includes a memory control circuit 1207 which controls reading and writing (R/W) of HS correction data from a device driving portion 1206 which controls driving of actuators and the like which convey the recording medium and memories 1208, 1209, 1210, and 1211 in the individual recording heads. The CPU 1201 executes various programs stored in the RAM 1202 to achieve the operation of the second embodiment. The printing apparatus 1102 includes mounted thereon line type recording heads (hereinafter simply referred to as "recording head") corresponding to arrays of nozzles of four colors of cyan, magenta, yellow, and black. Although the ink colors are described as the four colors in the second embodiment, the ink colors may include colors such as light cyan other than the above-mentioned four colors and a special ink color dedicated for a specific purpose. Each recording head may be detachably mounted on a carriage or the like.

Figure 22:
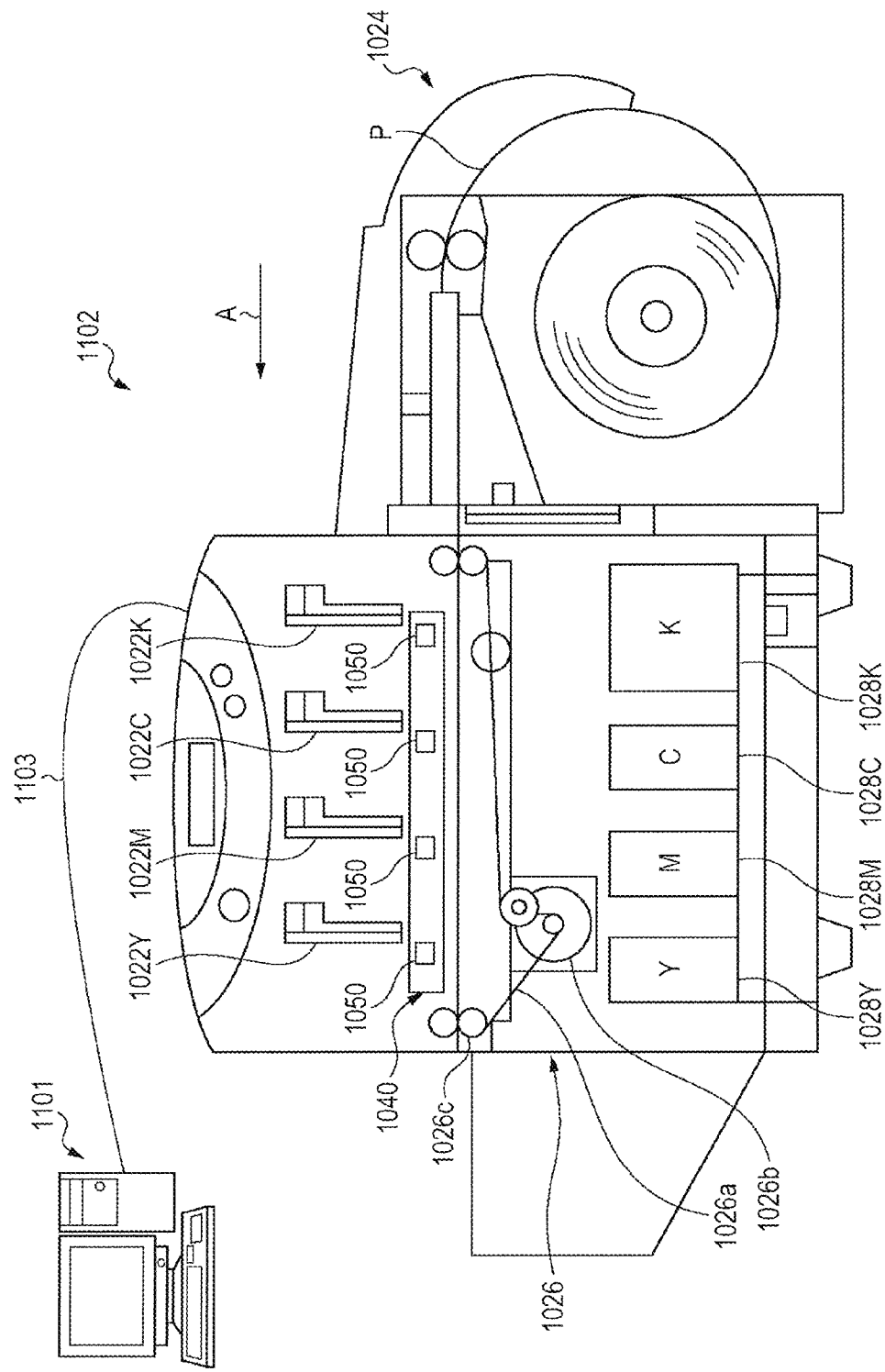
FIG. 22 is a diagram illustrating an example of the configuration of the printing apparatus.

FIG. 22 is a diagram illustrating the outline of the configuration of the printing apparatus 1102 according to the second embodiment. The printing apparatus 1102 ejects inks onto a recording medium P from the recording heads 1022K, 1022C, 1022M, and 1022Y to effect printing based on record data to be printed which is sent from the host PC 1101. The recording heads 1022K, 1022C, 1022M, and 1022Y respectively corresponding to four colors are arranged in order in a direction of conveying the recording medium P (direction of arrow A). Specifically, the recording heads 1022K for black ink, the recording head 1022C for cyan ink, the recording head 1022M for magenta ink, and the recording head 1022Y for yellow ink are arranged in this order in the conveying direction. The recording heads 1022K, 1022C, 1022M, and 1022Y are so-called full line type recording heads, and are aligned in parallel to one another over the entire recording width with respect to the conveying direction of the recording medium. At the time of recording data, the printing apparatus 1102 drives the heaters provided in the individual recording heads, without moving the recording heads, to eject inks from the ink ejection ports (nozzles) to record data.

As recording with the recording heads is carried out, a foreign matter such as dust and ink droplets may adhere to the nozzles-provided surfaces (nozzle surfaces) of the recording heads 1022K, 1022C, 1022M, and 1022Y so that the ejection state changes, influencing recording. Therefore, in order to ensure stable ink ejection from the recording heads 1022K, 1022C, 1022M, and 1022Y, the printing apparatus 1102 is provided with a recovery unit 1040. The recovery unit 1040 regularly cleans the nozzle surfaces so that the proper ink ejection states of the nozzles of the recording heads 1022K, 1022C, 1022M, and 1022Y can be kept, or can be recovered. The recovery unit 1040 is provided with caps 1050 for removing inks from the ink ejection surfaces of the four recording heads 1022K, 1022C, 1022M, and 1022Y in the cleaning operation. The caps 1050 are formed for the respective recording heads 1022K, 1022C, 1022M, and 1022Y, and each include a blade, an ink removing member, a blade holding member, and a cap.

The recording medium P or a roll of paper is supplied from a roll paper feeding unit 1024, and is conveyed in the direction indicated by the arrow A by a conveying mechanism 1026 formed in the printing apparatus 1102. The conveying mechanism 1026 includes a conveyor belt 1026a which conveys the recording medium P placed thereon, a conveyor motor 1026b which rotates the conveyor belt 1026a, and a roller 1026c configured to apply tension to the conveyor belt 1026a. At the time of recording data, when the recording medium P being conveyed reaches under the recording head 1022K, the recording head 1022K ejects black ink based on the record data sent from the host PC 1101. Likewise, ink of each color is ejected in the order of the recording heads 1022C, 1022M and 1022Y to achieve color recording on the recording medium P. Further, the printing apparatus 1102 includes ink tanks 1028K, 1028C, 1028M, and 1028Y configured to store the inks to be supplied to the respective recording heads 1022K, 1022C, 1022M, and 1022Y, a pump configured to supply ink to each recording head, and a pump configured to perform the cleaning operation.

Referring again to FIG. 13, an EEPROM which is a rewritable nonvolatile memory, for example, is used for each of the memories 1208 to 1211 in the respective recording heads 1022K, 1022C, 1022M, and 1022Y. Corresponding recording head IDs and HS correction data are previously written in the respective memories 1208 to 1211 before the operation of the second embodiment such as upon factory shipment. The recording head IDs are assigned in such a way that each recording head ID does not conflict with that of a recording head of the same color, and with those of the recording heads of the other colors. The HS correction data represents density characteristic information corresponding to each nozzle in the nozzle array of the recording head corresponding to each ink color. The ejection characteristic of ink differs from one nozzle to another due to a manufacturing error. In executing HS correction on image data to be printed or the like, density correction is executed on each nozzle referring to the density characteristic information so that the density approaches an ideal density. Needless to say, when the user replaces the recording head with another one, the density characteristic information is changed to different information. Therefore, the printing apparatus 1102 stores the HS correction data representing the density characteristic information, together with the recording head ID, in the memories 1208 to 1211 in the respective recording heads 1022K, 1022C, 1022M, and 1022Y.

Next, referring to FIG. 14, a description will be provided of the operation when the host PC 1101 requests the printing apparatus 1102 to send HS correction data stored in each of the memories 1208 to 1211 in the respective recording heads 1022K, 1022C, 1022M, and 1022Y so that the host PC 1101 executes HS processing on form data. The processing of FIG. 14 is achieved, for example, when the CPU 1220 executes the printer driver loaded into the memory 1222. The processing of FIG. 14 is executed at the time of execution of HS processing event when, for example, an operation other than the form overlay print is executed. Alternatively, when activated, the host PC 1101 may execute the processing of FIG. 14 after identifying the connection to the printing apparatus 1102, or the host PC 1101 may execute the processing of FIG. 14 when detecting replacement of the recording head of the printing apparatus 1102 by the user.

First, the CPU 1220 requests the printing apparatus 1102 for HS processing data of each ink color (S1301). In response to the request from the host PC 1101, the printing apparatus 1102 obtains the recording head IDs and HS correction data corresponding to the individual ink colors from the memories 1208 to 1211, and sends the obtained recording head IDs and HS correction data to the host PC 1101. The CPU 1220 obtains the recording head IDs and HS correction data corresponding to all the ink colors of the printing apparatus 1102 (S1302: one example of first obtainment). The CPU 1220 associates the recording head ID with the HS correction data for each ink color, and stores the associated recording head ID and HS correction data as a data set of HS correction in the storage area such as the memory 1222, the HDD 1227, and the like (S1303).

Figure 15:
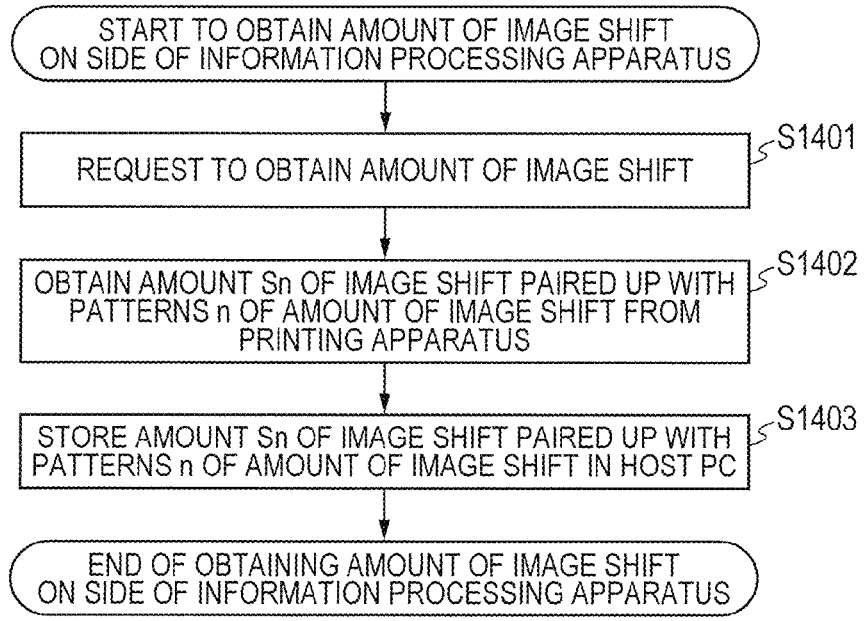
FIG. 15 is a flowchart illustrating procedures of a process of obtaining the amount of image shift.

FIG. 15 is a flowchart illustrating procedures of a requesting process of obtaining each pattern of the amount of image shift for an image shift in the nozzle array direction set in the printing apparatus 1102. To prevent biased use of nozzles, the printing apparatus 1102 may shift assignment of nozzles for record data in a visually unnoticeable level, for example, by one nozzle. The amount of image shift is the amount of shift of the nozzles. A description will be provided of the operation when the host PC 1101 requests the printing apparatus 1102 to send the number of patterns of the amount of image shift and the amount of image shift for each pattern, both of which are stored in the printing apparatus 1102. The processing of FIG. 15 is achieved, for example, when the CPU 1220 executes the printer driver loaded into the memory 1222.

In step S1401, the CPU 1220 requests the printing apparatus 1102 to obtain the amount of image shift. In Step S1402, the CPU 1201 of the printing apparatus 1102 sends a previously-set number "n" of patterns of the amount of image shift, and each amount Sn of image shift paired up with the number "n" to the host PC 1101 in response to the request to obtain the amount of image shift from the host PC 1101 (one example of second obtainment). In Step S1403, the CPU 1220 associates the number "n" of patterns of the amount of image shift obtained in Step S1402 with the amount Sn of image shift for each of the number of patterns, and stores in the storage area such as the ROM 1229 the number "n" of patterns of the amount of image shift and the amount Sn of image shift for each of the number of patterns as a data set of the amount of image shift.

Figure 16:
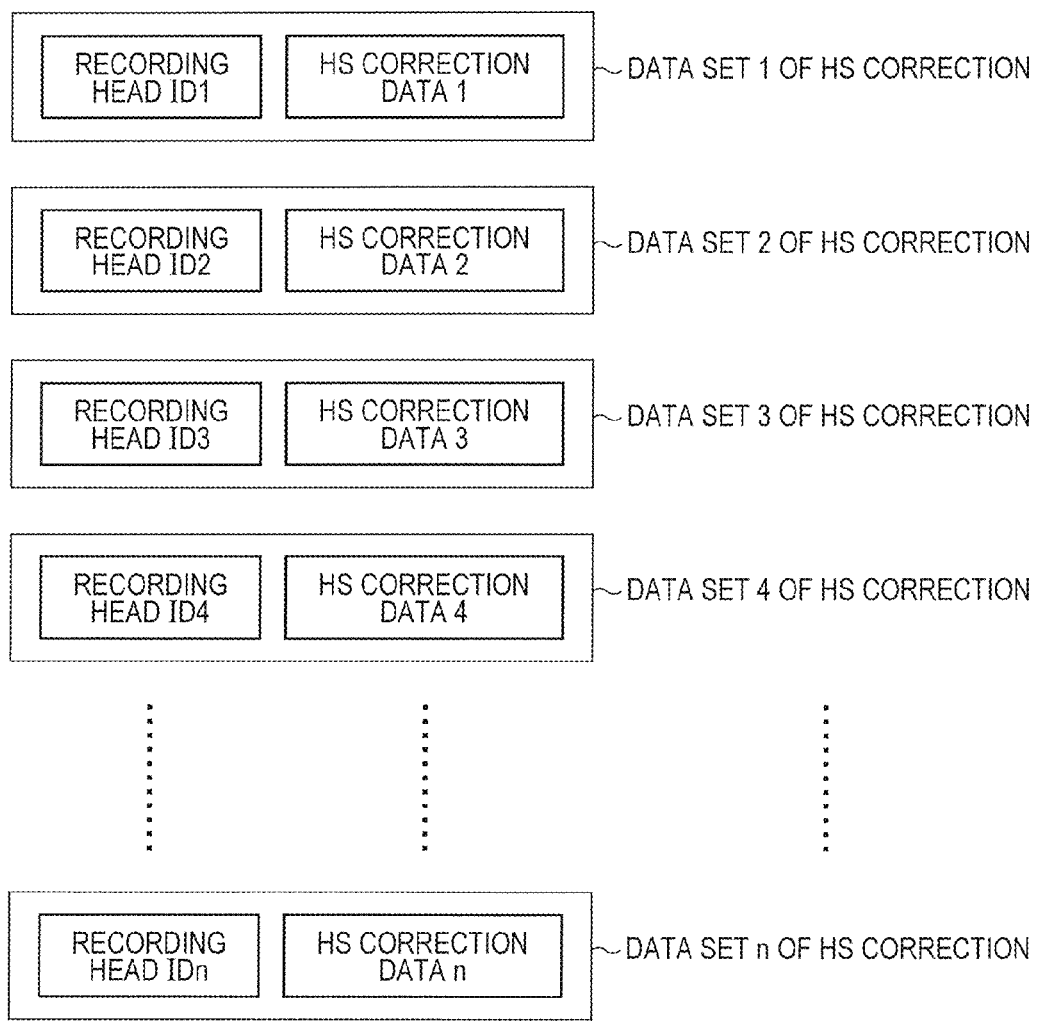
FIG. 16 is a diagram illustrating a data set of HS correction.

FIG. 16 is a diagram illustrating a data set of HS correction stored in the storage area of the memory 1222, the HDD 1227, or the like in the processing of FIG. 14. As illustrated in FIG. 16, one recording head ID is associated with one corresponding piece of HS correction data. FIG. 16 illustrates data sets of HS correction corresponding to all the ink colors in the printing apparatus 1102. When there are a plurality of printing apparatus from which HS correction data is to be obtained, however, the data sets of HS correction illustrated in FIG. 16 may be stored for each printing apparatus. When a recording head is replaced with another one in the printing apparatus from which HS correction data has been already obtained, the CPU 1220 obtains HS correction data again.

Figure 17:
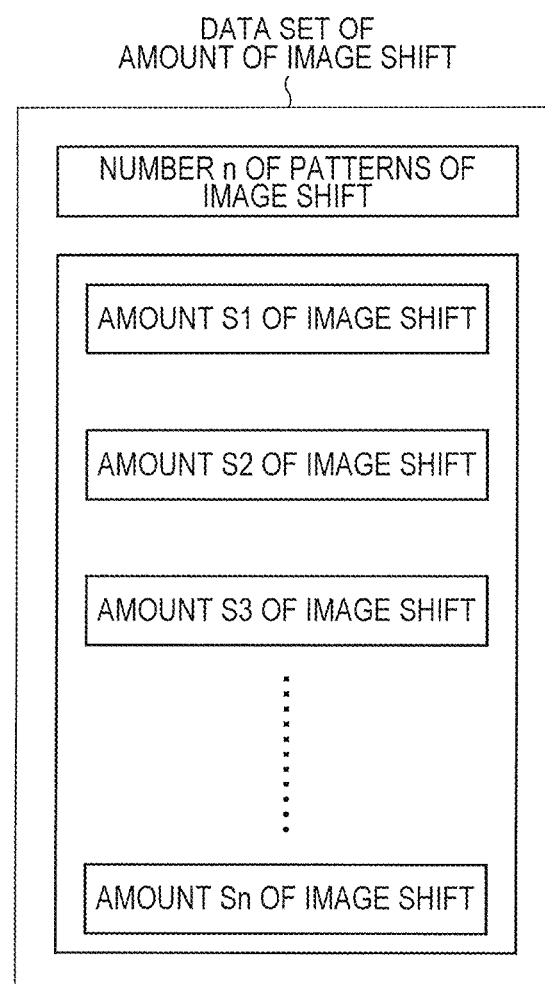
FIG. 17 is a diagram illustrating a data set of the amount of image shift.

FIG. 17 is a diagram illustrating a data set of the amount of image shift stored in the storage area of the ROM 1229 or the like in the processing of FIG. 15. As illustrated in FIG. 17, the number "n" of patterns of the amount of image shift and the amount Sn of image shift for each of the number of patterns are associated with each other, and are stored as a data set of the amount of image shift. When the number "n" of patterns of the amount of image shift is 3, for example, the amounts of image shift, S1 to S3, are stored as data sets of the amount of image shift. The amount of image shift is an amount represented by the number of nozzles, and is set, for example, as (the amount S1 of image shift) is (+3 nozzles), (the amount S2 of image shift) is (0 nozzle), and (the amount S3 of image shift) is (−3 nozzles). Regarding the data sets of the amount of image shift, the number "n" of patterns may be fixed or variable in a single printing apparatus 1102. When the number "n" of patterns is fixed but the amount of image shift is variable, the CPU 1220 may obtain data sets of the amount of image shift from the printing apparatus 1102 again every time.

Figure 18:
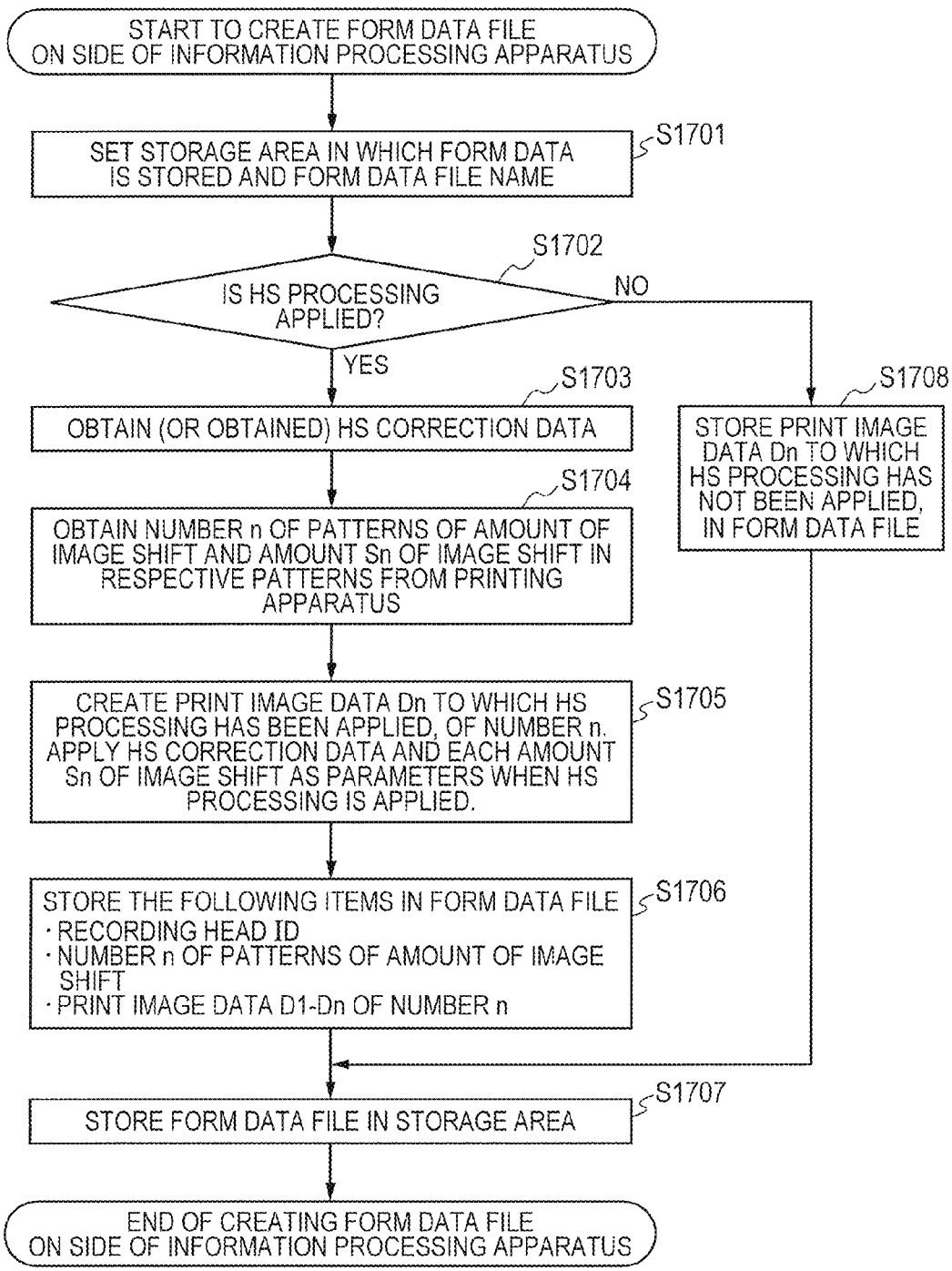
FIG. 18 is a flowchart illustrating procedures of a process of creating form data.

FIG. 18 is a flowchart illustrating procedures of a process for the CPU 1220 to store form data in the storage area of the memory 1222, the HDD 1227, or the like in the host PC 1101. The processing of FIG. 18 is achieved, for example, when the CPU 1220 executes the printer driver loaded into the memory 1222.

In Step S1701, the CPU 1220 creates a form data file, and sets an area to store the form data file, and a file name. In the second embodiment, the user who registers form data sets the storage area and the file name on a user interface provided by the printer driver. In Step S1702, the CPU 1220 determines whether or not to apply HS processing to print image data (form data). When the CPU 1220 determines that HS processing is to be applied to print image data, the processing proceeds to Step S1703. When the CPU 1220 determines that HS processing is not to be applied to print image data, the processing proceeds to Step S1708. For example, this determination may be made by the CPU 1220 based on the contents of setting previously determined by an application configured to execute the form overlay print, or may be made by the CPU 1220 based on the user setting mode on the user interface screen.

Figure 23A:
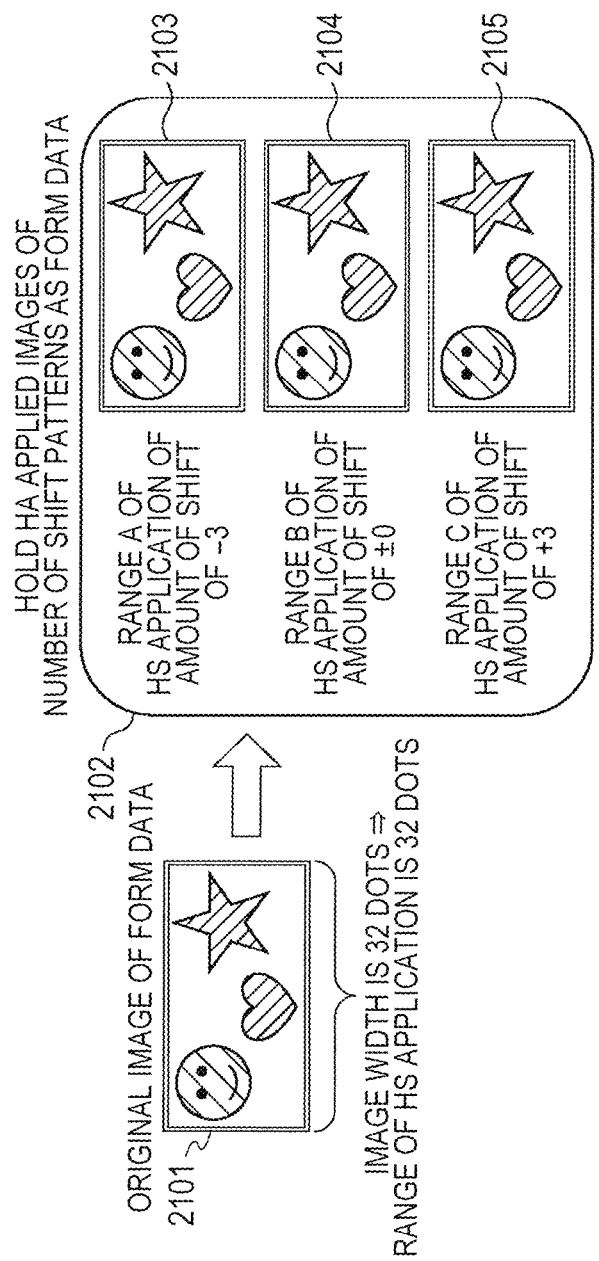
FIGS. 23A and 23B are diagrams illustrating the concept on parameters in a process in S1705.
Figure 23B:
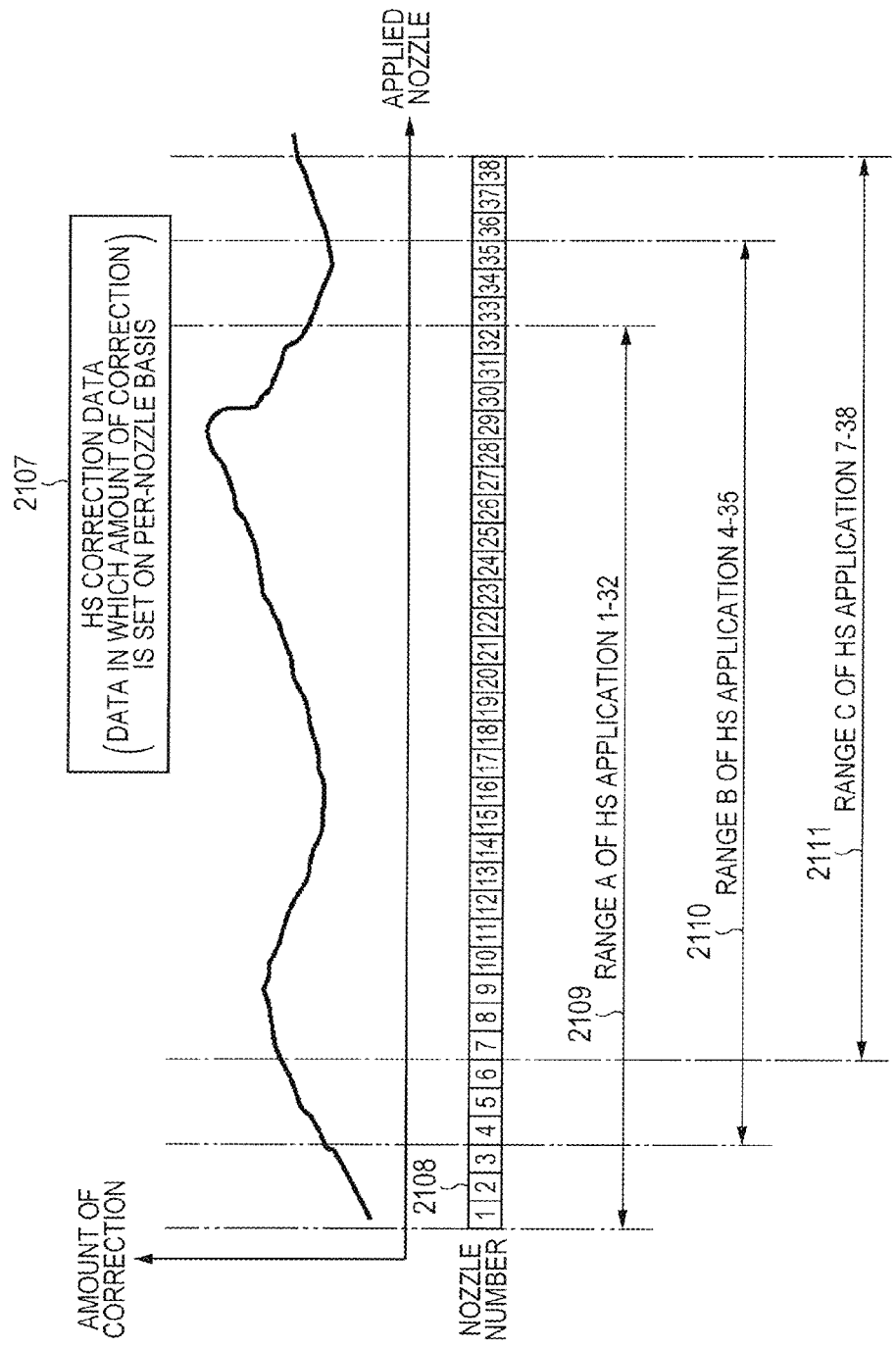

In Step S1703, the CPU 1220 obtains HS correction data needed to apply HS processing on print image data. At this point of time, the HS correction data may have already been obtained in the processing of FIG. 14. In Step S1704, the CPU 1220 obtains the amounts Sn of image shift for "n" patterns retained in the printing apparatus 1102. At this point of time, the amounts of image shift may have already been obtained in the processing of FIG. 15. In Step S1705, the CPU 1220 creates print image data Dn which is obtained by application of HS processing for "n" patterns of the amount of image shift to the print image data. In applying HS processing, the HS correction data and the amount of image shift for each pattern which are obtained in Steps S1703 and S1704 are used. The details of the process of S1705 are given. FIGS. 23A and 23B illustrate the concept on parameters in the process in S1705. When the amount of image shift takes three patterns of "−3, 0, +3," the CPU 1220 creates three pieces of print image data 2103, 2104, and 2105 which are obtained by applying HS processing corresponding to the patterns of the amount of image shift to the print image data (form data) 2101, and stores those pieces of print image data in the storage area of the ROM 1229 or the like as form data 2102. In FIG. 23B, HS correction data which is density characteristic information (data in which the amount of correction is set for each nozzle) corresponding to each nozzle in the nozzle array of the recording head is denoted by 2107. For nozzle number 2108, the range (range A of HS application) of nozzles used when an image shift by the amount of image shift of "−3" is executed by the printing apparatus 1102 is denoted by 2109 (nozzle numbers 1 to 32), the range (range B of HS application) of nozzles used when an image shift by the amount of image shift of "0" is executed by the printing apparatus 1102 is denoted by 2110 (nozzle numbers 4 to 35), and the range (range C of HS application) of nozzles used when an image shift by the amount of image shift of "3" is executed by the printing apparatus 1102 is denoted by 2111 (nozzle numbers 7 to 38).

The print image data 2103 is created when the CPU 1220 executes HS processing corresponding to the range A of HS application to the form data on the premise that the nozzles in the HS application range A 2109 are used. Likewise, the print image data 2104 is created when the CPU 1220 executes HS processing corresponding to the range B of HS application to the form data on the premise that the nozzles in the HS application range B 2110 are used. Further, the print image data 2105 is created when the CPU 1220 executes HS processing corresponding to the range C of HS application to the form data on the premise that the nozzles in the HS application range C 2111 are used.

In Step S1706, the CPU 1220 stores the recording head IDs, the number "n" of patterns of the amount of image shift, and the print image data Dn to which HS processing has been executed in the form data file. The structure of the form data file at this time will be described later referring to FIG. 19. In Step S1707, the CPU 1220 stores the form data file created in Step S1706 in the storage area designated in Step S1701 with the file name also designated in S1701.

When it is determined in Step S1702 that HS processing is not to be applied, the processing proceeds to Step S1708. In Step S1708, the CPU 1220 simply stores one piece of normal print image data as a form data file.

Figure 19:
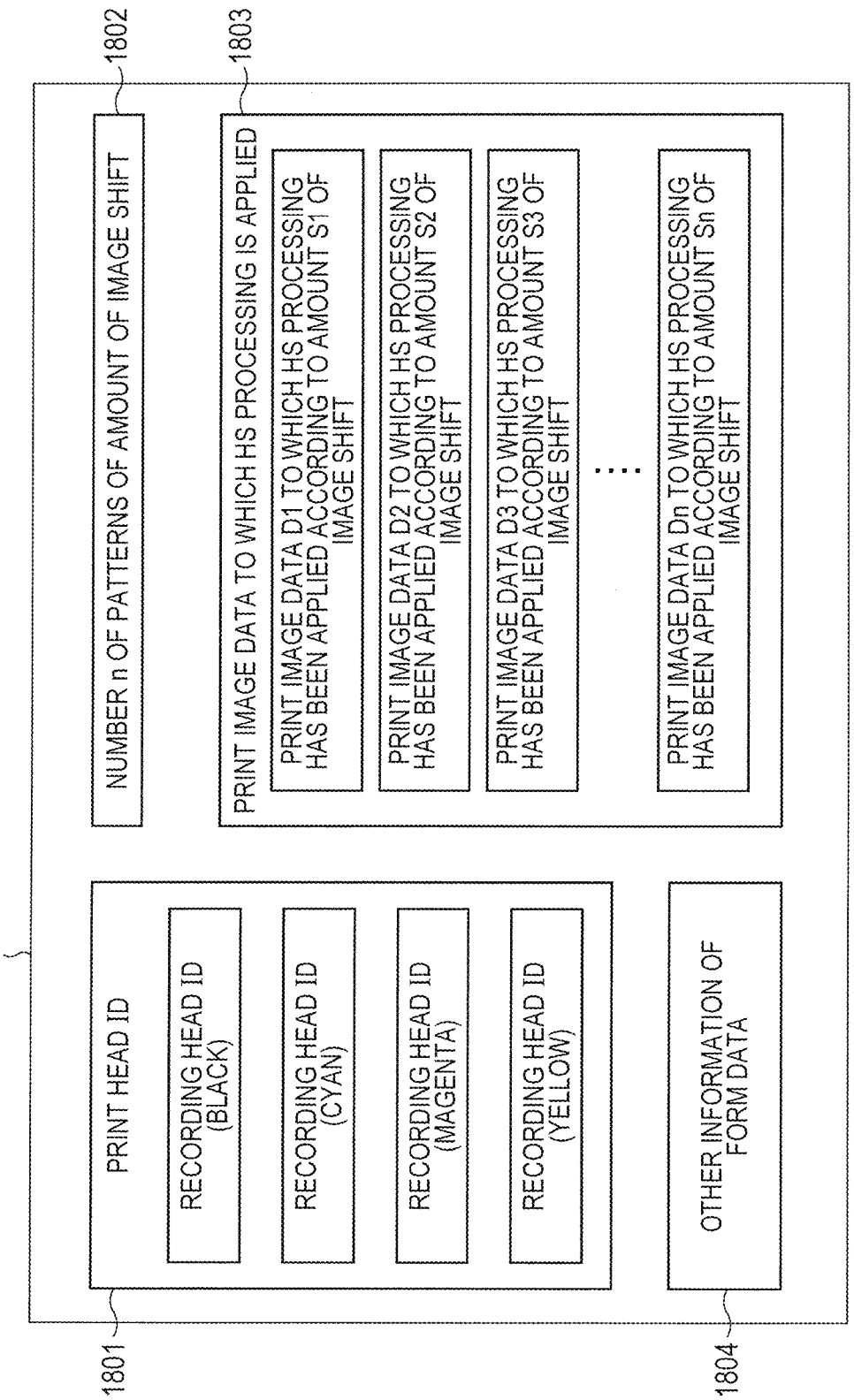
FIG. 19 is a diagram illustrating a form data file.

FIG. 19 is a diagram illustrating the structure of a form data file 1800 stored in Step S1706. Of the data sets of HS correction illustrated in FIG. 16, the recording head IDs associated with the HS correction data actually applied at the time of executing HS processing are stored in an area 1801. Of information on the data sets of the amount of image shift applied to HS processing, the number "n" of patterns of the amount of image shift is stored in an area 1802. The number "n" of patterns is used as flag data for determining whether or not HS processing has been executed on the print image data when the printing apparatus 1102 refers to the form data file 1800. Of information on the data sets of the amount of image shift applied to HS processing, print image data Dn created according to the amount Sn of image shift, to which the HS processing has been applied, is stored in an area 1803. The creation according to the amount of image shift means a process of shifting image data by a predetermined number of nozzles in the nozzle array direction. The form data file and arbitrary data needed for the form overlay print are stored in an area 1804 as other information.

Figure 20:
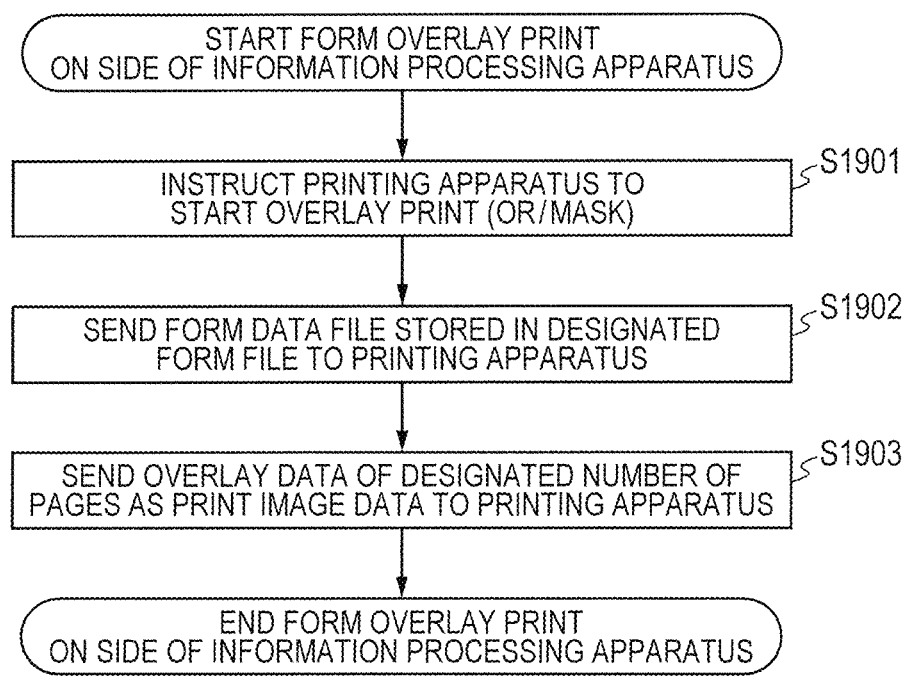
FIG. 20 is a flowchart illustrating procedures of form overlay printing in the host PC.

FIG. 20 is a flowchart illustrating procedures of the process of executing the form overlay print in the host PC 1101. The processing illustrated in FIG. 20 is achieved, for example, when the CPU 1220 executes the printer driver loaded into the memory 1222.

In Step S1901, the CPU 1220 sends an instruction to start the form overlay print from the host PC 1101 to the printing apparatus 1102 according to an instruction made by the user on the user interface screen for executing the form overlay print. At this time, an arbitrary setting data related to the form overlay print, such as a method of combination (OR, MASK) designated by the user, may be sent at the same time. In Step S1902, the CPU 1220 sends the form data file 1800 illustrated in FIG. 19 to the printing apparatus 1102 from the host PC 1101. In Step S1903, the CPU 1220 sends overlay data to the printing apparatus 1102 from the host PC 1101. At the time of sending, the CPU 1220 sends overlay data for the number of pages designated by the user to the printing apparatus 1102 as print image data.

Figure 21:
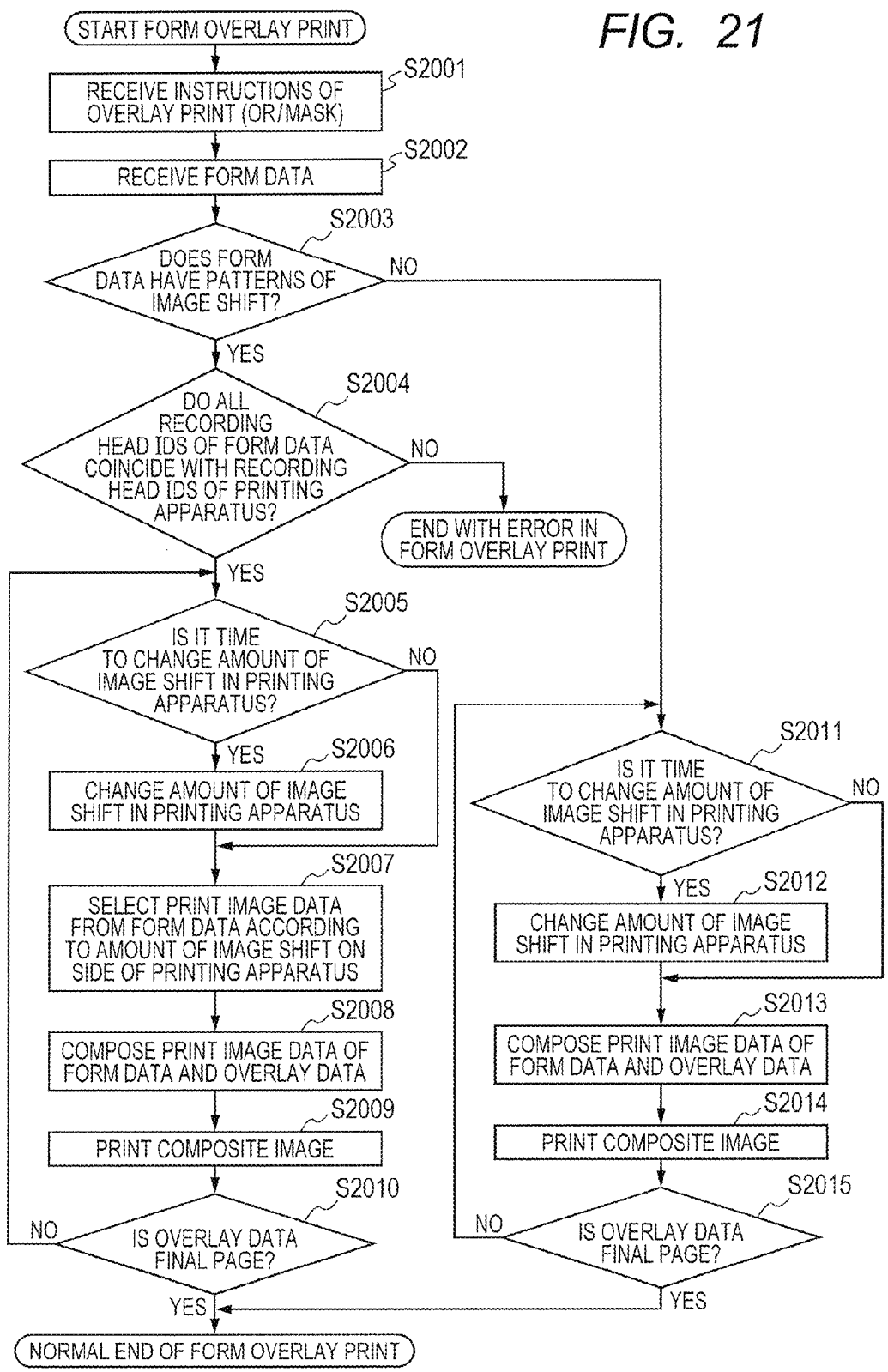
FIG. 21 is a flowchart illustrating procedures of form overlay printing in the printing apparatus.

FIG. 21 is a flowchart illustrating procedures of the process of executing the form overlay print in the printing apparatus 1102. The processing illustrated in FIG. 21 is achieved, for example, when the CPU 1201 executes the program stored in the ROM 1203.

In Step S2001, the CPU 1201 receives the instruction to start the form overlay print from the host PC 1101. At this time, an arbitrary setting data related to the form overlay print, such as a method of combination (OR, MASK), may be received at the same time. The received data is stored in the RAM 1202. In Step S2002, the CPU 1201 receives the form data file 1800 sent from the host PC 1101, and stores the form data file 1800 in the RAM 1202.

In Step S2003, the CPU 1201 determines whether or not there is form data to which the HS processing has been applied based on the presence/absence of the number "n" of patterns of the amount of image shift in the form data file 1800 received in Step S2002. When the form data file 1800 has the number "n" of patterns of the amount of image shift, the CPU 1201 determines that there is form data to which the HS processing has been applied, and the processing proceeds to Step S2004. When the form data file 1800 does not have the number "n" of patterns of the amount of image shift, the CPU 1201 determines that normal form overlay print is to be executed, and the processing proceeds to Step S2011.

In Step S2004, the CPU 1201 compares the recording head IDs in the form data file 1800 received in Step S2002 with the recording head IDs of the recording heads corresponding to the respective ink colors and currently mounted in the printing apparatus 1102 to determine whether or not there is a difference. As a result of the comparison, when the CPU 1201 determines that the recording head IDs match, the processing proceeds to Step S2005. On the other hand, when the CPU 1201 determines that there is a difference in the recording head IDs, the quality of the image obtained by the form overlay print using the form data to which the HS processing has been applied is not guaranteed, and hence this processing is terminated with the form overlay print being regarded as an error.

In Step S2005, the CPU 1201 determines whether or not it is the timing for changing the amount of image shift in the form overlay print. In the second embodiment, the amount of image shift is changed in units of pages at an arbitrary time previously set by the printing apparatus 1102. Therefore, the amount of image shift is changed, for example, every 10,000 pages. When the CPU 1201 determines in Step S2005 that it is the timing for changing the amount of image shift, the processing proceeds to Step S2006. On the other hand, when the CPU 1201 determines that it is not the timing for changing the amount of image shift, the processing proceeds to Step S2007.

In Step S2006, the CPU 1201 changes the set amount of image shift. In Step S2007, the CPU 1201 selects print image data which matches the amount of image shift currently set in the printing apparatus 1102 from the print image data D1 to Dn to which the HS processing has been applied in the form data received in Step S2002.

In Step S2008, the CPU 1201 combines the print image data in the overlay data with the print image data in the form data selected in Step S2007. The image combination is carried out according to the combination method designated in the print instruction sent from the host PC 1101 in Step S2001. In Step S2009, the CPU 1201 ejects ink droplets from the recording heads to print based on the digitized print image data as the result of image combination. Although the printing apparatus 1102 has been described as an inkjet recording apparatus in the second embodiment, a thermal type printing apparatus, a printing apparatus using a laser beam, or any other printing apparatus may be used as long as the printing apparatus can apply HS processing, execute form overlay print, and execute image shift. In such a case, the host PC 1101 obtains density characteristic information corresponding to the printing apparatus using the respective recording systems from each printing apparatus.

In Step S2010, the CPU 1201 determines whether or not the page of the overlay data to be combined is the last page. When the CPU 1201 determines that it is not the last page, the CPU 1201 repeats the processing from Step S2005 with a next page being treated as the target for the image combination. When the CPU 1201 determines that it is the last page, on the other hand, this processing is terminated, considering that the form overlay print has been properly terminated.

When the number "n" of patterns is not included in the form data file 1800 in Step S2003, it is determined that normal form overlay print is to be carried out, and the processing proceeds to Step S2011. In Steps S2011 to S2015, the image combination is performed on the form data to which HS processing has not been applied. Further, form data included in the form data file 1800 is only one piece of print image data.

In Step S2011, the CPU 1201 determines whether or not it is the timing for the printing apparatus 1102 to change the amount of image shift. The description of Step S2011 is the same as that of Step S2005. When the CPU 1201 determines in Step S2011 that it is the timing for changing the amount of image shift, the processing proceeds to Step S2012. On the other hand, when the CPU 1201 determines that it is not the timing for changing the amount of image shift, the processing proceeds to Step S2013.

In Step S2012, as in Step S2006, the CPU 1201 changes the set amount of image shift. In Step S2013, the CPU 1201 combines print image data in the overlay data with the print image data in the form data included in the form data file 1800 in Step S2013. In Step S2014, like in Step S2009, the CPU 1201 ejects ink droplets from the recording heads to print based on the digitized print image data as the result of image combination. In Step S2015, like in Step S2010, the CPU 1201 determines whether or not the page of the overlay data to be combined is the last page. When the CPU 1201 determines that it is not the last page, the CPU 1201 repeats the processing from Step S2011 with a next page being treated as the target for the image combination. When the CPU 1201 determines that the page is the last page, on the other hand, this processing is terminated, considering that the form overlay print has been properly terminated. Although the determination in Step S2003 is made based on whether or not the number "n" of patterns is included in the form data file 1800, the determination may be made based on whether or not the number "n" of patterns is equal to or greater than 1. In this case, when the host PC 1101 does not execute HS processing, the host PC 1101 sets the number "n" of patterns to 0, and the processing proceeds to Step S2011 when the printing apparatus 1102 detects that the number "n" of patterns is 0.

Although the above description has been given of the second embodiment, various other modifications and alterations than those described above are feasible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-265651, filed Dec. 4, 2012, and No. 2012-265653, filed Dec. 4, 2012 which are hereby incorporated by reference herein in their entirety.

What is claimed is:

1. A recording system, comprising:
a recording apparatus configured to perform recording using a recording head having a plurality of recording elements; and
an image processing apparatus which is in a different body from that of the recording apparatus and configured to send data, which is to be recorded by the recording apparatus, to the recording apparatus,
the recording apparatus comprising:
a shifting unit configured to dynamically shift a range of use of the plurality of recording elements in an array direction of the plurality of recording elements of the recording head to enable selectively a plurality of recording ranges; and
a recording-apparatus-side sending unit configured to send data on the plurality of recording ranges to the image processing apparatus, the recording-apparatus-side sending unit sending selectively the data on the plurality of recording ranges according to the range of use shifted by the shifting unit,
the image processing apparatus comprising:
a head shading correction unit configured to execute, based on the data on the recording range sent selectively from the recording apparatus, head shading correction on image data; and
an image-processing-apparatus-side sending unit configured to send the image data, on which the head shading correction is executed by the head shading correction unit, and the recording range, on which the head shading correction is executed, from the image processing apparatus to the recording apparatus,
the recording apparatus having a control unit configured to cause recording elements in the recording range sent from the image-processing-apparatus-side sending unit to perform recording based on the image data, on which the head shading correction is executed, sent from the image-processing-apparatus-side sending unit.

2. A recording system according to claim 1, wherein, in a case where the image data, on which the head shading correction is executed, is sent from the image processing apparatus, the recording apparatus performs recording by the recording elements in the recording range sent together with the image data, on which the head shading correction is executed, and in a case where the image data, on which the head shading correction is executed, is not sent from the image processing apparatus, the recording apparatus obtains a recording range from the shifting unit and performs recording by recording elements in an obtained recording range.

3. A recording system according to claim 2, wherein the image processing apparatus further comprises:
- an information-of-uneven-density obtaining unit configured to obtain information of uneven density reflecting a characteristic of the recording head sent from the recording apparatus; and
- a determination unit configured to determine whether the head shading correction is to be executed based on the information of uneven density,
- wherein, in a case where the determination unit determines that the head shading correction is to be executed, the head shading correction unit executes the head shading correction.

4. An image processing apparatus configured to send image data to be recorded to a recording apparatus which performs recording using a recording head having a plurality of recording elements and is configured to dynamically shift a range of use of the plurality of recording elements in an array direction of the plurality of recording elements of the recording head to enable selectively a plurality of recording ranges, the image processing apparatus being in a different body from that of the recording apparatus, the image processing apparatus comprising:
- a data obtaining unit configured to obtain data on the plurality of recording ranges sent from the recording apparatus;
- a head shading correction unit configured to execute, based on the data on the recording range sent selectively from the recording apparatus, head shading correction on the image data; and
- a sending unit configured to send the image data, on which the head shading correction is executed, and the recording range, on which the head shading correction is executed, to the recording apparatus.

5. An image processing apparatus according to claim 4, further comprising:
- an information-of-uneven-density obtaining unit configured to obtain information of uneven density reflecting a characteristic of the recording head sent from the recording apparatus; and
- a determination unit configured to determine whether the head shading correction is to be executed based on the information of uneven density,
- wherein, in a case where the determination unit determines that the head shading correction is to be executed, the head shading correction unit executes the head shading correction.

6. A recording apparatus configured to receive data to be recorded from an image processing apparatus and perform recording using a recording head having a plurality of recording elements, the recording apparatus being in a different body from that of the image processing apparatus, the recording apparatus comprising:
- a shifting unit configured to dynamically shift a range of use of the plurality of recording elements in an array direction of the plurality of recording elements of the recording head to enable selectively a plurality of recording ranges;
- a sending unit configured to send data on the plurality of recording ranges to the image processing apparatus, the sending unit sending selectively the data on the plurality of recording ranges according to the range of use shifted by the shifting unit;
- a reception unit configured to receive image data, on which head shading correction is executed by the image processing apparatus, and the recording range, on which the head shading correction is executed, from the image processing apparatus; and
- a control unit configured to cause recording elements in the recording range received by the reception unit to perform recording based on the image data, on which the head shading correction is executed, received by the reception unit.

7. A recording apparatus according to claim 6, further comprising:
- a count unit configured to count a number of pages of a recording medium recorded by the recording head; and
- a comparison unit configured to compare the number of pages counted by the count unit with a predetermined value,
- wherein if the number of pages counted and compared by the comparison unit exceeds the predetermined value, the shifting unit changes the recording range.

8. A recording apparatus according to claim 7, wherein the reception unit further receives a number of pages of a recording medium to be recorded based on image data from the image processing apparatus, before a start of recording.

9. A recording apparatus according to claim 8, wherein the recording head includes a plurality of inkjet recording heads which eject inks of a plurality of colors; and
- each of the plurality of inkjet recording heads is provided with a nonvolatile memory configured to store head shading correction data reflecting a characteristic of a corresponding inkjet recording head.

10. A recording apparatus according to claim 6, wherein, in a case where the reception unit receives the image data on which the head shading correction is executed, the recording apparatus performs recording by the recording elements in the recording range received together with the image data on which the head shading correction is executed, and in a case where the reception unit does not receive the image data on which the head shading correction is executed, the recording apparatus obtains a recording range from the shifting unit and performs recording by recording elements in an obtained recording range.

11. A recording control method used in a recording system, the recording system including a recording apparatus configured to perform recording using a recording head having a plurality of recording elements, and an image processing apparatus which is in a different body from that of the recording apparatus and configured to send data to be recorded by the recording apparatus to the recording apparatus, the recording control method comprising:
- a shifting step of dynamically shifting a range of use of the plurality of recording elements in an array direction of the plurality of recording elements of the recording head to enable selectively a plurality of recording ranges in the recording apparatus;
- a recording-apparatus-side sending step of sending data on the plurality of recording ranges from the recording apparatus to the image processing apparatus, the recording-apparatus-side sending step sending selectively the data on the plurality of recording ranges according to the range of use shifted in the shifting step;
- a head shading correction step of executing, based on the data on the recording range sent selectively from the recording apparatus, head shading correction on image data in the image processing apparatus;
- an image-processing-apparatus-side sending step of sending the image data, on which the head shading correction is executed in the head shading correction step, and the recording range, on which the head shading correction is executed, to the recording apparatus; and a control step of causing recording elements in the recording range sent in the image-processing-apparatus-side sending step to perform recording based on the image data, on which the head shading correction is executed, in the recording apparatus.

12. A recording control method according to claim 11, wherein, in the recording apparatus, in a case where the image data, on which the head shading correction is executed, is sent in the image-processing-apparatus-side sending step, the recording is performed by the recording elements in the recording range sent together with the image data on which the head shading correction is executed, and in a case where the image data, on which the head shading correction is executed, is not sent in the image-processing-apparatus-side sending step, a recording range selected in the shifting unit is obtained and the recording is performed by recording elements in an obtained recording range.

13. A recording control method according to claim 12, further comprising:
- an information-of-uneven-density obtaining step of obtaining information of uneven density reflecting a characteristic of the recording head sent from the recording apparatus in the image processing apparatus; and
- a determination step of determining whether the head shading correction is to be executed based on the information of uneven density in the image processing apparatus, wherein, in a case where the determination step determines that the head shading correction is to be executed, the head shading correction step executes the head shading correction.

\* \* \* \* \*